United States Patent [19]
Rokugawa

[11] Patent Number: 5,796,792
[45] Date of Patent: Aug. 18, 1998

[54] DATA IDENTIFYING DEVICE AND LIGHT RECEIVER USING THE SAME

[75] Inventor: Hiroyuki Rokugawa, Kawasaki, Japan

[73] Assignee: Fujitsu Limited, Kanagawa, Japan

[21] Appl. No.: 581,158

[22] Filed: Dec. 29, 1995

[30] Foreign Application Priority Data

Mar. 20, 1995 [JP] Japan ................ 7-061328
Nov. 20, 1995 [JP] Japan ................ 7-301442

[51] Int. Cl.$^6$ ............................................. H04L 7/00
[52] U.S. Cl. ..................... 375/354; 370/516; 370/517; 370/518
[58] Field of Search ..................... 370/516, 517, 370/518, 519; 375/371, 372, 354

[56] References Cited

U.S. PATENT DOCUMENTS

| | | | |
|---|---|---|---|
| 5,022,056 | 6/1991 | Henderson et al. | 375/119 |
| 5,127,026 | 6/1992 | Kelly et al. | 375/106 |
| 5,197,062 | 3/1993 | Picklesimer | 370/13 |
| 5,452,323 | 9/1995 | Rosen | 375/354 |
| 5,544,203 | 8/1996 | Casasanta et al. | 375/376 |
| 5,550,860 | 8/1996 | Georgiou et al. | 375/220 |
| 5,553,104 | 9/1996 | Takashi et al. | 375/373 |
| 5,588,004 | 12/1996 | Suzuki et al. | 370/516 |
| 5,619,506 | 4/1997 | Burch et al. | 370/506 |

FOREIGN PATENT DOCUMENTS

| | | |
|---|---|---|
| 62-130037 | 6/1987 | Japan . |
| 1-188050 | 7/1989 | Japan . |
| 1-233850 | 9/1989 | Japan . |
| 2-121431 | 5/1990 | Japan . |
| 3-293833 | 12/1991 | Japan . |

*Primary Examiner*—Stephen Chin
*Assistant Examiner*—Mohammad Ghayour
*Attorney, Agent, or Firm*—Helfgott & Karas, P C.

[57] ABSTRACT

A device for identifying input data by using a first clock signal includes a first identifying unit which identifies the input data by using the first clock signal to generate first identified data and generates a first phase-relation determination result by determining whether a phase relation between the input data and the first clock signal is appropriate, a delay unit for delaying the input data by a predetermined phase amount to generate delayed input data, a second identifying unit which identifies the delayed input data by using the first clock signal to generate second identified data and generates a second phase-relation determination result by determining whether a phase relation between the delayed input data and the first clock signal is appropriate, and a selection unit which selects one of the first identified data and the second identified data based on at least one of the first phase-relation determination result and the second phase-relation determination result.

15 Claims, 16 Drawing Sheets

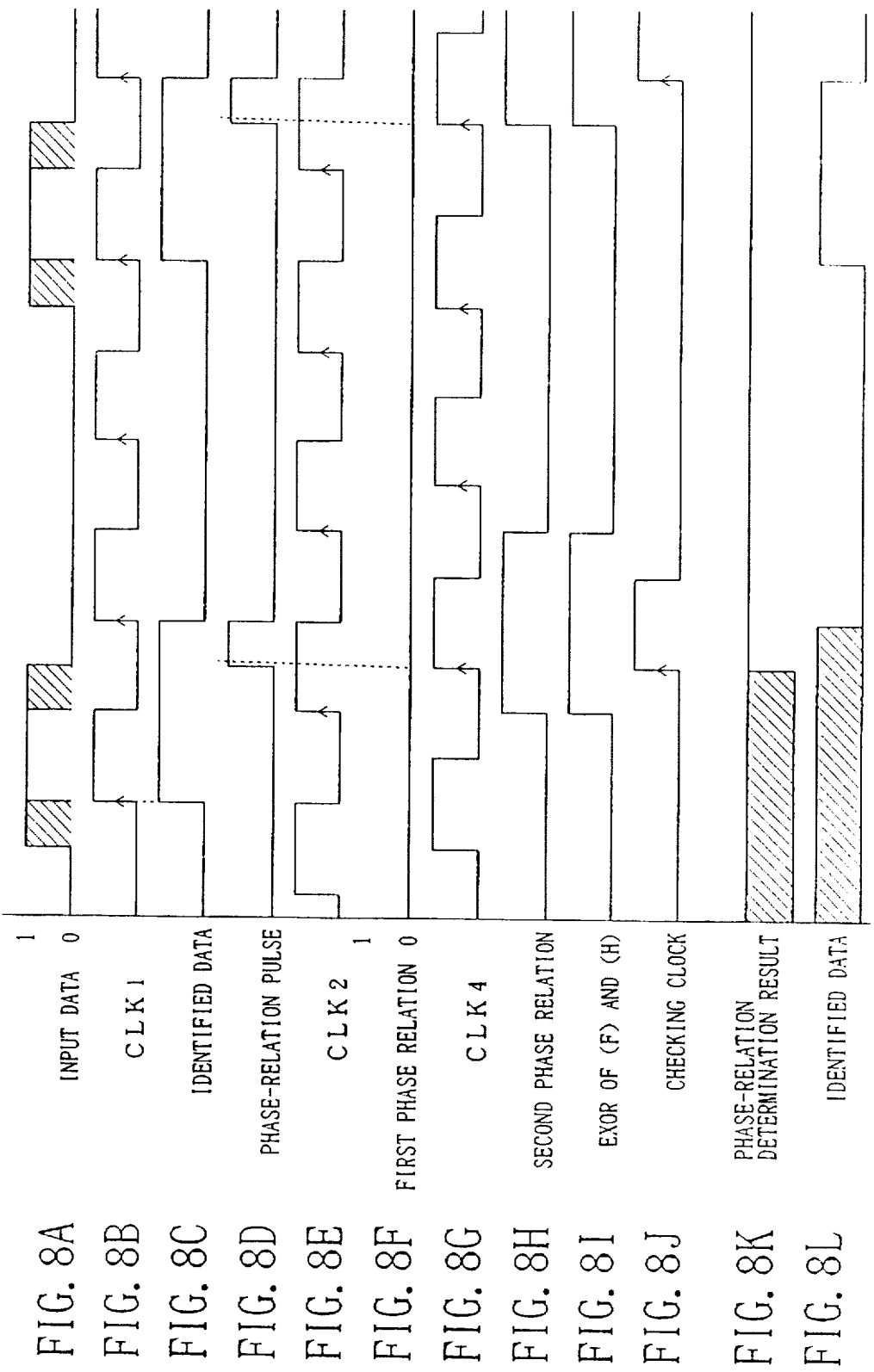

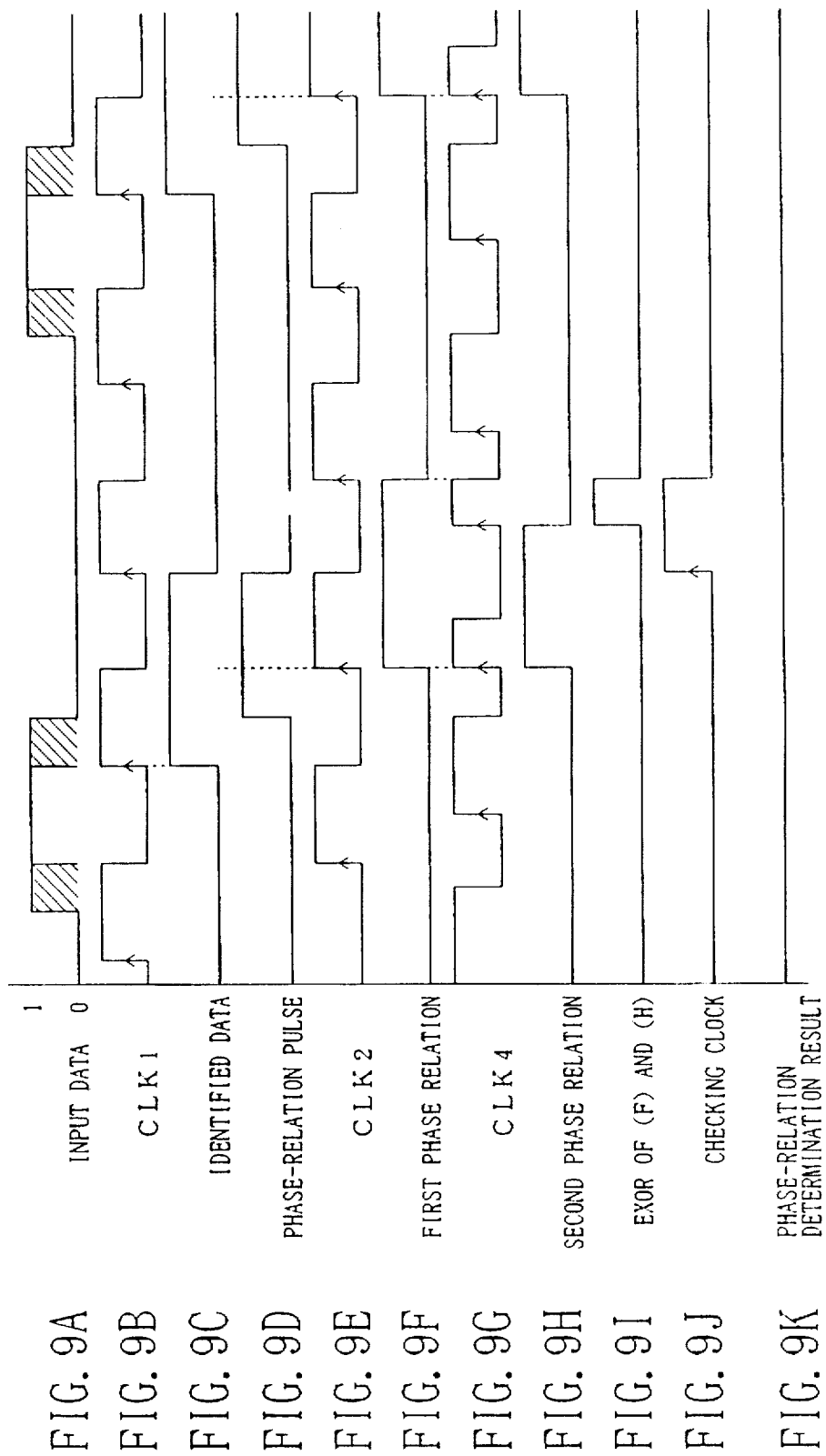

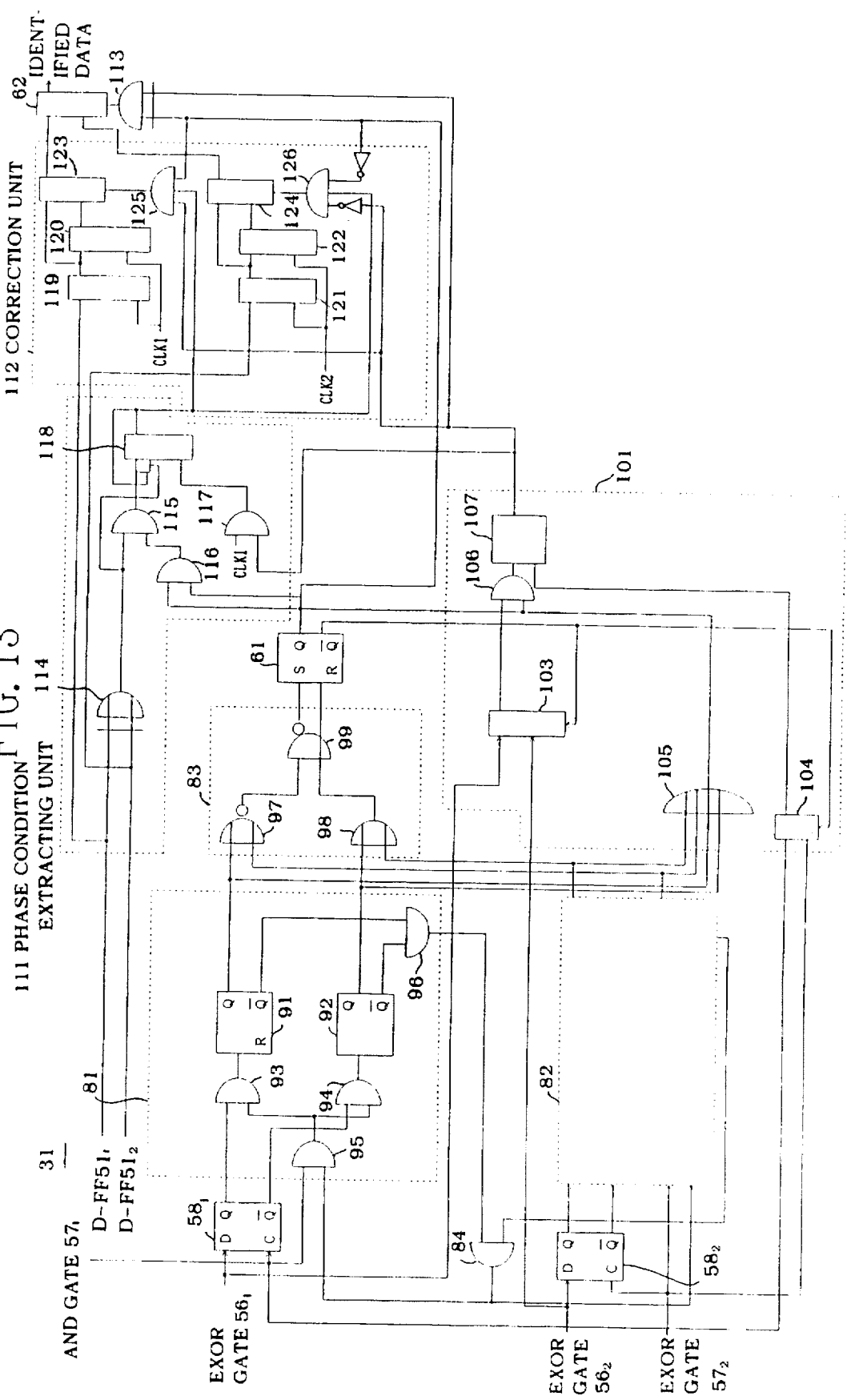

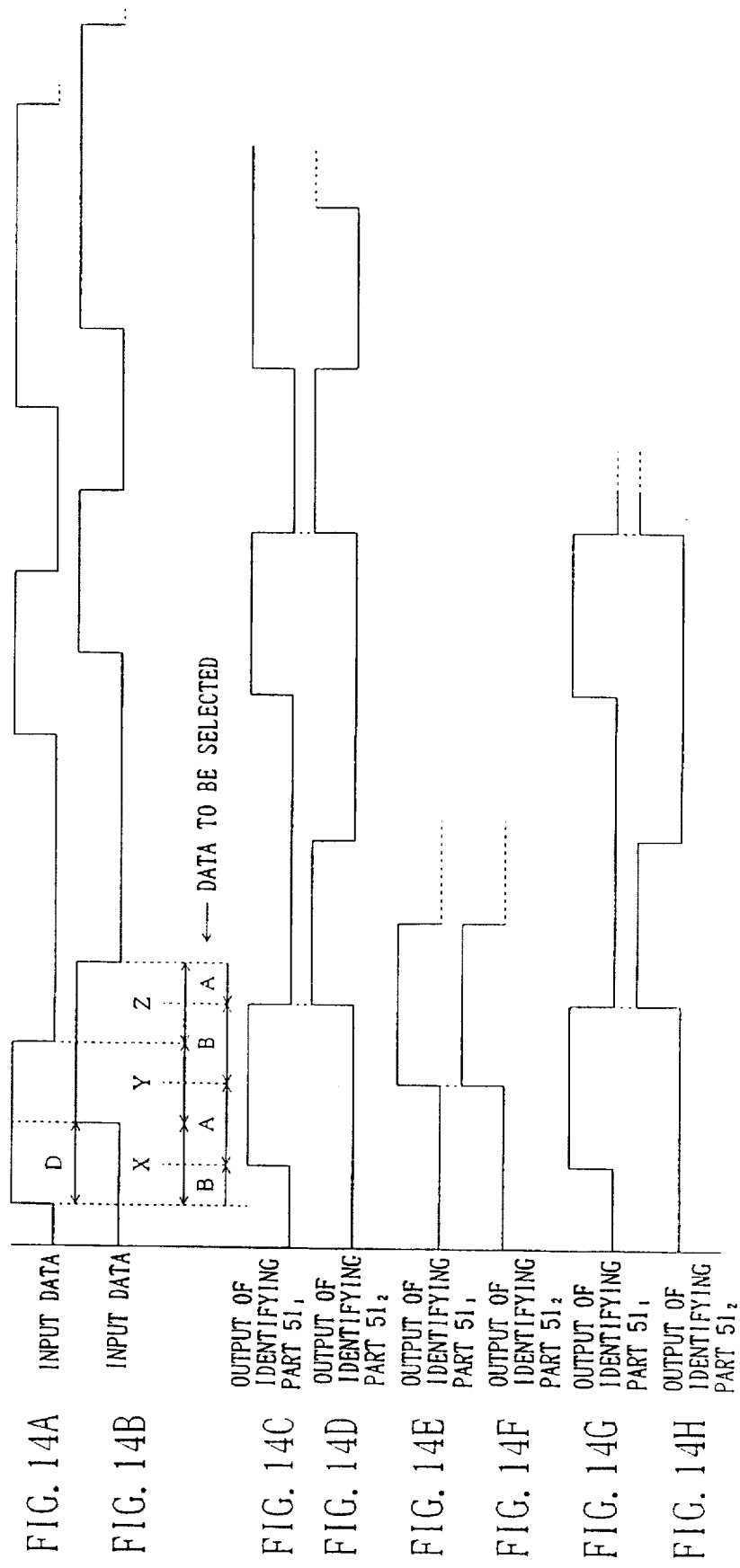

DATA IDENTIFYING DEVICE AND LIGHT RECEIVER USING THE SAME

BACKGROUND OF THE INVENTION

1. Field of the Invention

The present invention generally relates to data identifying devices and light receivers, and particularly relates to a data identifying device and a light receiver which identify signals transmitted through digital-signal transmission lines.

With recent developments of optical communication technologies, an optical fiber technology has been introduced not only into trunk-line systems but also into subscriber-line systems, through which broadband information transmission for sending moving pictures and the like becomes available for households. As a result, such a scheme as fiber-to-the-home (FTTH) has been attracting attention to an extent that a feasibility study thereof has been conducted. A prerequisite for an introduction of the optical fiber technology into the subscriber-line systems is that the introduction be achieved at a low cost. Thus, there is a need to simplify the structure of transmitters and receivers compared to those used in the trunk lines, so as to reduce the number of adjustable factors of these devices.

2. Description of the Related Art

In the digital-signal transmission systems using optical fibers for transmitting digital signals, optical transit trunks are installed to provide inter-office transmission in the trunk-line systems. Light receivers of the optical transit trunks convert optical signals sent via the optical fibers into electric signals, and are equipped with an identifying circuit which identifies 0s and 1s of the converted digital signals. The identifying circuit generally adjusts a phase relation (i.e., relation of timing) between the data and an identifying clock used for identifying the data.

FIG. 1 is a block diagram of a light receiver of the related art. In FIG. 1, a light receiver 11 connected to an optical fiber 12 includes a light receiving device 13, an equalizer/amplifier circuit 14, a timing circuit 15, and an identifying circuit 16. The light receiving device 13 converts an optical signal transmitted through the optical fiber 12 into an electric current through a photoelectric process. The equalizer/amplifier circuit 14 amplifies the detected signal up to an identifiable level. The timing circuit 15 extracts an identifying clock, which is supplied to the identifying circuit 16 along with the amplified signal. The identifying circuit 16 identifies 0s and 1s in the amplified signal to generate identified data.

The phase relation between the identifying clock and the amplified data supplied to the identifying circuit 16 varies due to a variation in propagation speeds of signals through a transmission network. Thus, in order to assure an appropriate phase relation, the phase relation must be adjusted. The light receiver 11 used in the optical transit trunks often employs a coaxial cable for connecting between the timing circuit 15 and the identifying circuit 16, for example, so that an adjustment of the length of the coaxial cable can provide an appropriate phase relation. Also, there are known devices in which a phase relation is adjusted automatically through an application of the IC technology.

FIG. 2 is a block diagram of an automatic-phase-adjustment device of the related art.

An automatic-phase-adjustment device 21 shown in FIG. 2 is disclosed in a paper by Peter Cochrane et al. (IEEE Journal on Selected Areas in Communications, Vol. SAC-4, No. 9, December, 1986). The automatic-phase-adjustment device 21 includes an S-R latch circuit 22, a delay unit 23, a differential amplifier 24, a D flip-flop 25, an S-R latch circuit 26, a comparator 27, a voltage-controlled phase shifter 28, and a clock extracting circuit 29. Input data is latched by the S-R latch circuit 22, which generates an output signal having a high level during a time duration corresponding to the delay time of the delay unit 23. This output signal is integrated by a resistance R1 and a capacitor C1, and, then, is applied to one input of the differential amplifier 24. Delayed input signal is applied to the D flip-flop 25 to generate identified data.

The identified data is applied to the S-R latch circuit 26, whose output signal is integrated by a resistance R2 and a capacitor C2 to be applied to the other input of the differential amplifier 24. An output of the differential amplifier 24 is a code-error signal which represents a difference between the pre-identified signal and the post-identified signal. The output of the differential amplifier 24 is compared with a reference voltage level by the comparator 27, an output of which is fed back to the voltage-controlled phase shifter 28.

Also, the input data is applied to the clock extracting circuit 29, where a clock signal is extracted from the input data to be supplied to the voltage-controlled phase shifter 28. The voltage-controlled phase shifter 28 is used for adjusting a phase of the clock signal based on the feedback signal mentioned above. The clock signal adjusted by the voltage-controlled phase shifter 28 is supplied to the D flip-flop 25, which uses the adjusted clock signal to generate the identified data.

In the automatic-phase-adjustment device 21 described above, in contrast with the case in which the coaxial cable is used, even if an optimal phase relation is changed because of changes in temperature-dependent or time-dependent characteristics of the circuits, a constant phase relation is maintained based on the signal feedback.

The automatic-phase-adjustment device 21 described above which is used for keeping an appropriate phase by controlling the phase of the clock signal through analog means results in a complexity of the circuit and a large power consumption. Thus, it is difficult to employ the automatic-phase-adjustment device 21 in the subscriber-line systems.

Since transmission distances in the subscriber-line systems are short (one to several kilometers) in comparison with inter-office transmissions, a large signal level can be used for light input to the light receiver 11. In this case, it is possible to obtain a large phase tolerance assuring desired characteristics of signals which the identifying circuit 16 receives. Thus, instead of using a phase control method based on analog processing, one clock signal can be selected from a plurality of prepared clock signals having different relative phases such that the selected clock signal is used for identifying the received signal. Such a method is disclosed in Japanese Laid-Open Patent Applications No. 1-233850 and No. 1-188050, which are hereinafter referred to as first and second references, respectively.

In the first reference, two clock signals having slightly different timing with each other are used for identifying a signal. Then, if results of the identifications are different between these two, it is determined that the two clock signals do not have appropriate phases so that the phases of the clock signals are inverted. In the second reference, a clock signal having a frequency double the data speed is prepared, and is frequency divided by a T-flip-flop which is reset at a leading edge of incoming input data. In this manner, the input data is identified by a clock having some time delay from the leading edge of the input data.

Identifying circuits of these two references can be implemented on logic circuits using gate arrays and the like. Thus, simple identifying circuits can be produced at a low cost.

In the first reference, however, when both of the two clock signals mistakenly identify data "0" as data "1", for example, these two clock signals are judged to be appropriate. Also, the identification results are sensitive to a time difference between the two clock signals and to a time difference between two signals applied to two identifying circuits (D flip-flops) after division of the input signal into the two signals. Thus, a design for very minute timing differences is required.

In the second reference, the clock signal having a frequency double the transmission speed of a transmission system is required. Thus, the entire system lacks a familiarity in a configuration thereof, and, also, has to be provided with a circuit for multiplying a frequency of the clock signal by a predetermined factor. As a result, the size of the circuit becomes large.

Other methods of identifying data are disclosed in Japanese Laid-Open Patent Applications No. 62-130037, No. 2-121431, and No. 3-293833.

In the above three references, input data is identified by using a polyphase clock. Since a phase of the clock is changed according to changes in the phase of the input data, synchronization processing is required for parallel signal processing in order to synchronize phases between different channels. Also, a number of clock signals should be prepared for a plurality of different phases. Thus, a timing design is difficult, and a circuit size becomes large.

In addition, a flexibility of selecting a transmission method is sacrificed because transmission codes usable in these three references are restricted to codes such as CMI (coded MARK inversion) codes for which an error detection is applicable.

Another method of identifying the input data is disclosed in the Japanese Laid-Open Patent Application No. 2-121431, in which input data is identified by combining identification results from a plurality of identifying units. In this method, even when outputs of the plurality of the identifying units are affected by each other, a phase of a clock to be selected is determined so that changing points of the identified data vary accordingly. Thus, a reliability of the system degrades significantly.

Accordingly, it is difficult to identify data while keeping an appropriate phase relation reliably between the data and a clock signal. Also, there is a problem of the circuits becoming complex and becoming a large size.

Accordingly, there is a need for a data identifying device and a light receiver which can generate identified data by using a simple circuit structure for keeping an appropriate phase relation between data and a clock signal.

SUMMARY OF THE INVENTION

Accordingly, it is a general object of the present invention to provide a data identifying device and a light receiver which can satisfy the need described above.

It is another and more specific object of the present invention to provide a data identifying device and a light receiver which can generate identified data by using a simple circuit structure for keeping an appropriate phase relation between data and a clock signal.

In order to achieve the above objects according to the present invention, a device for identifying input data by using a first clock signal includes a first identifying unit which identifies the input data by using the first clock signal to generate first identified data and generates a first phase-relation determination result by determining whether a phase relation between the input data and the first clock signal is appropriate, a delay unit for delaying the input data by a predetermined phase amount to generate delayed input data, a second identifying unit which identifies the delayed input data by using the first clock signal to generate second identified data and generates a second phase-relation determination result by determining whether a phase relation between the delayed input data and the first clock signal is appropriate, and a selection unit which selects one of the first identified data and the second identified data based on at least one of the first phase-relation determination result and the second phase-relation determination result.

In the device described above, the input data is supplied to the first identifying unit, and is supplied to the second identifying unit with the delay incurred by the delay unit. At both identifying units, the input data is identified based on the same identifying clock, and the phase relations between the input data and the identifying clock are determined. Then, the selection unit selects appropriate identified data based on the determinations of the phase relations. Thus, a simple circuit structure can generate the appropriate identified data by selecting an appropriate phase relation between the input data and the identifying clock.

Other objects and further features of the present invention will be apparent from the following detailed description when read in conjunction with the accompanying drawings.

BRIEF DESCRIPTION OF THE DRAWINGS

FIGS. 8A through 8L are time charts showing an operation of a data identifying device of FIG. 4;

FIGS. 9A through 9K are time charts showing another operation of the data identifying device of FIG. 4;

FIG. 13 is a block diagram of a data identifying device according to a fourth embodiment of the present invention;

FIGS. 14A through 14H are time charts for showing relations between two signals of input data on two different pathways and between two output signals of identified data generated through the two pathways;

DESCRIPTION OF THE PREFERRED EMBODIMENTS

In the following, a principle and embodiments of the present invention will be described with reference to the accompanying drawings.

Figure 1:
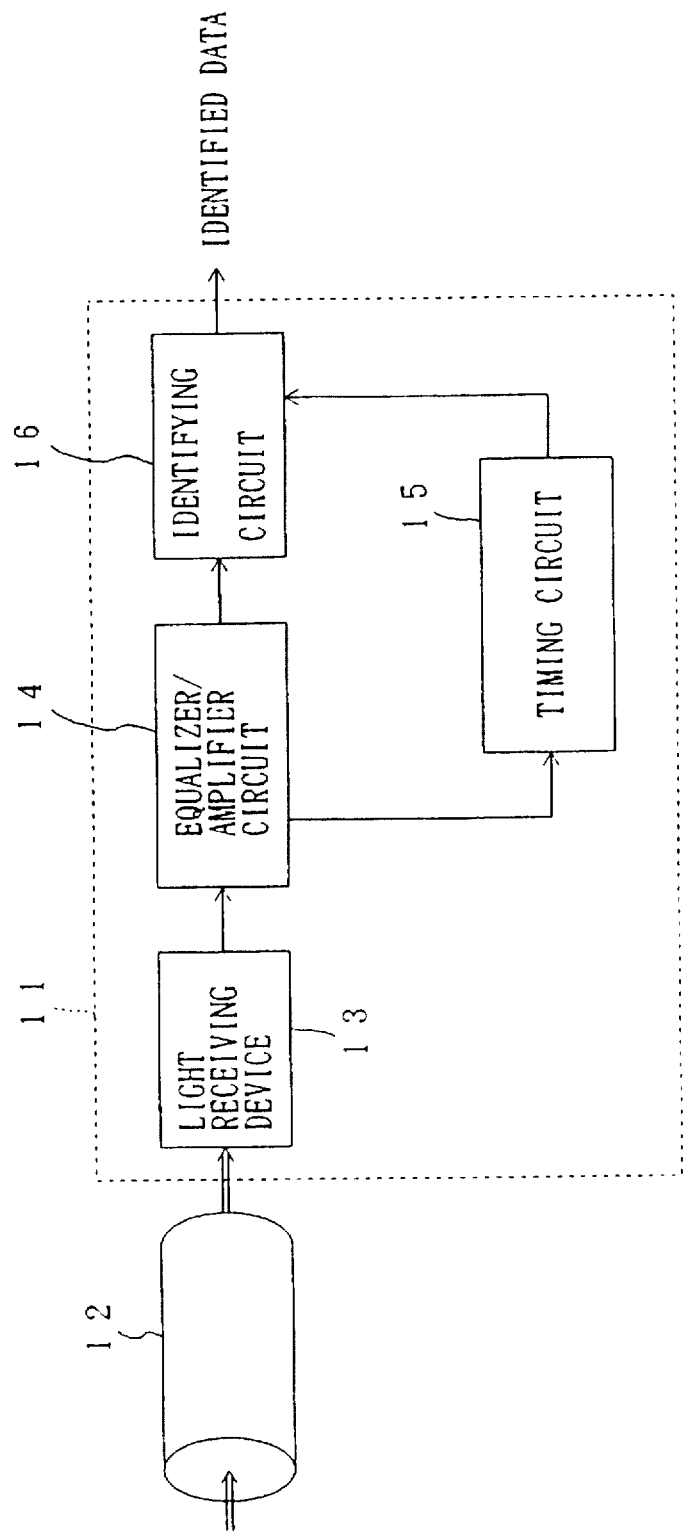
FIG. 1 is a block diagram of a light receiver of the related art.
Figure 2:
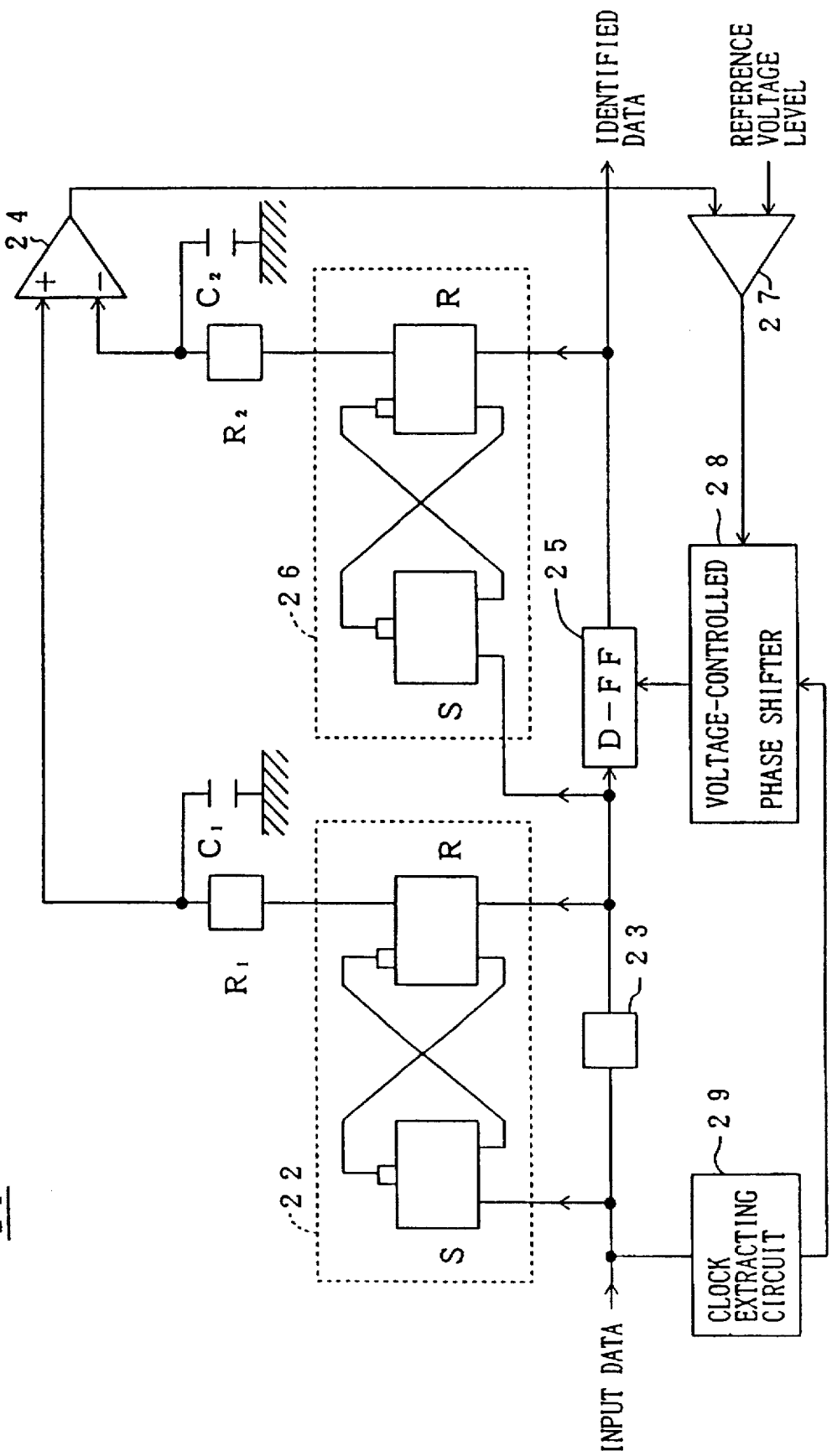
FIG. 2 is a block diagram of an automatic-phase-adjustment device of the related art.
Figure 3:
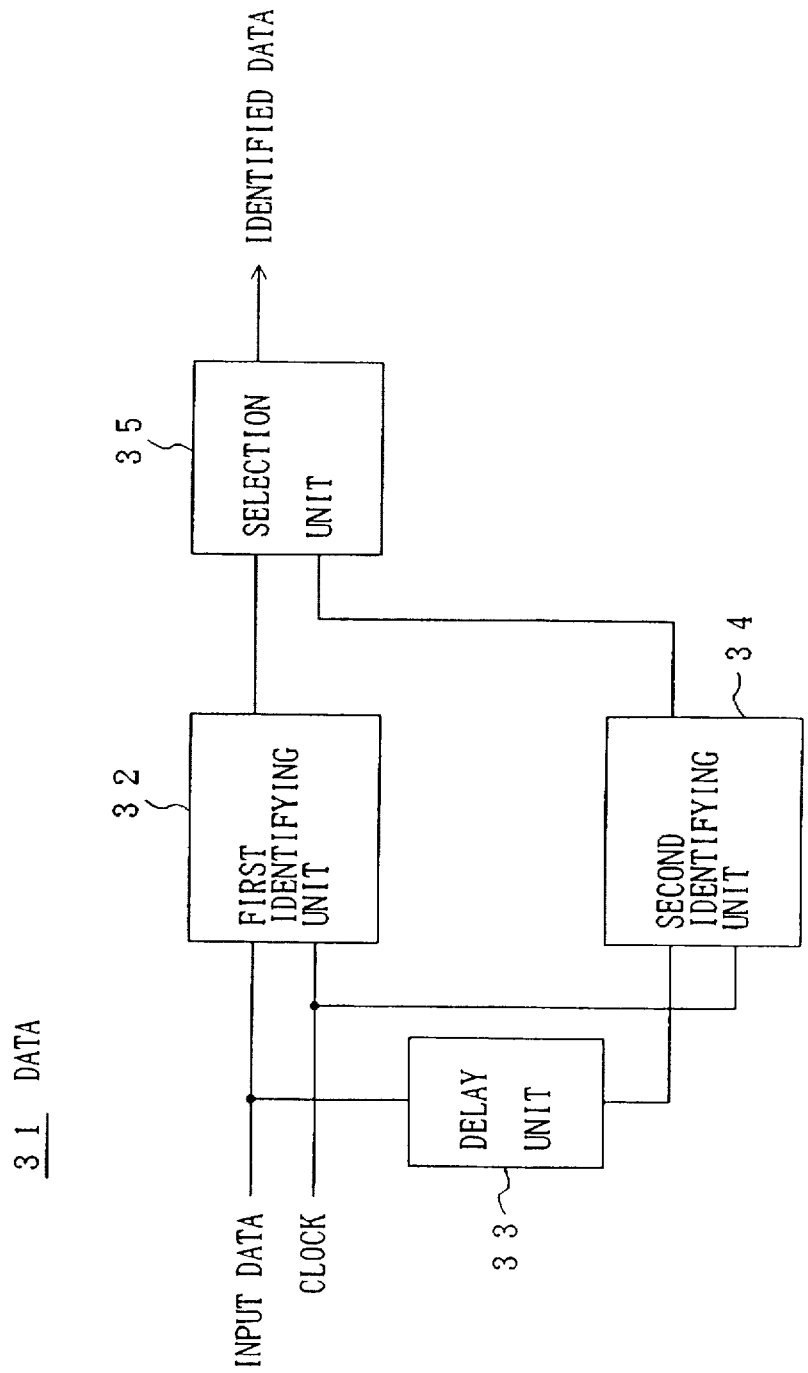
FIG. 3 is a block diagram of a data identifying device according to a principle of the present invention.

FIG. 3 is a block diagram of a data identifying device according to a principle of the present invention. A data identifying device 31 of FIG. 3 includes a first identifying unit 32, a delay unit 33, a second identifying unit 34, and a selection unit 35.

The first identifying unit 32 identifies input data by using a predetermined clock, and, also, determines a phase relation between the predetermined clock and the input data. The delay unit 33 provides a predetermined time delay (phase delay) for the input data which is supplied to the second identifying unit 34. The second identifying unit 34 identifies based on the predetermined clock the input data which has the phase delay compared with the input data supplied to the first identifying unit 32. Also, the second identifying unit 34 determines a phase relation between the predetermined clock and the input data. The selection unit 35 selects either the identified data of the first identifying unit 32 or the identified data of the second identifying unit 34 based on the phase determination results which are generated by the first identifying unit 32 and the second identifying unit 34.

According to the principle of the present invention, the input data is supplied to the first identifying unit, and is supplied to the second identifying unit with the delay incurred by the delay unit. At both identifying units, the input data is identified based on the same identifying clock, and the phase relations between the input data and the identifying clock are determined. Then, the selection unit selects appropriate identified data based on the determinations of the phase relations. Thus, a simple circuit structure can generate the appropriate identified data by selecting an appropriate phase relation between the input data and the identifying clock.

Figure 4:
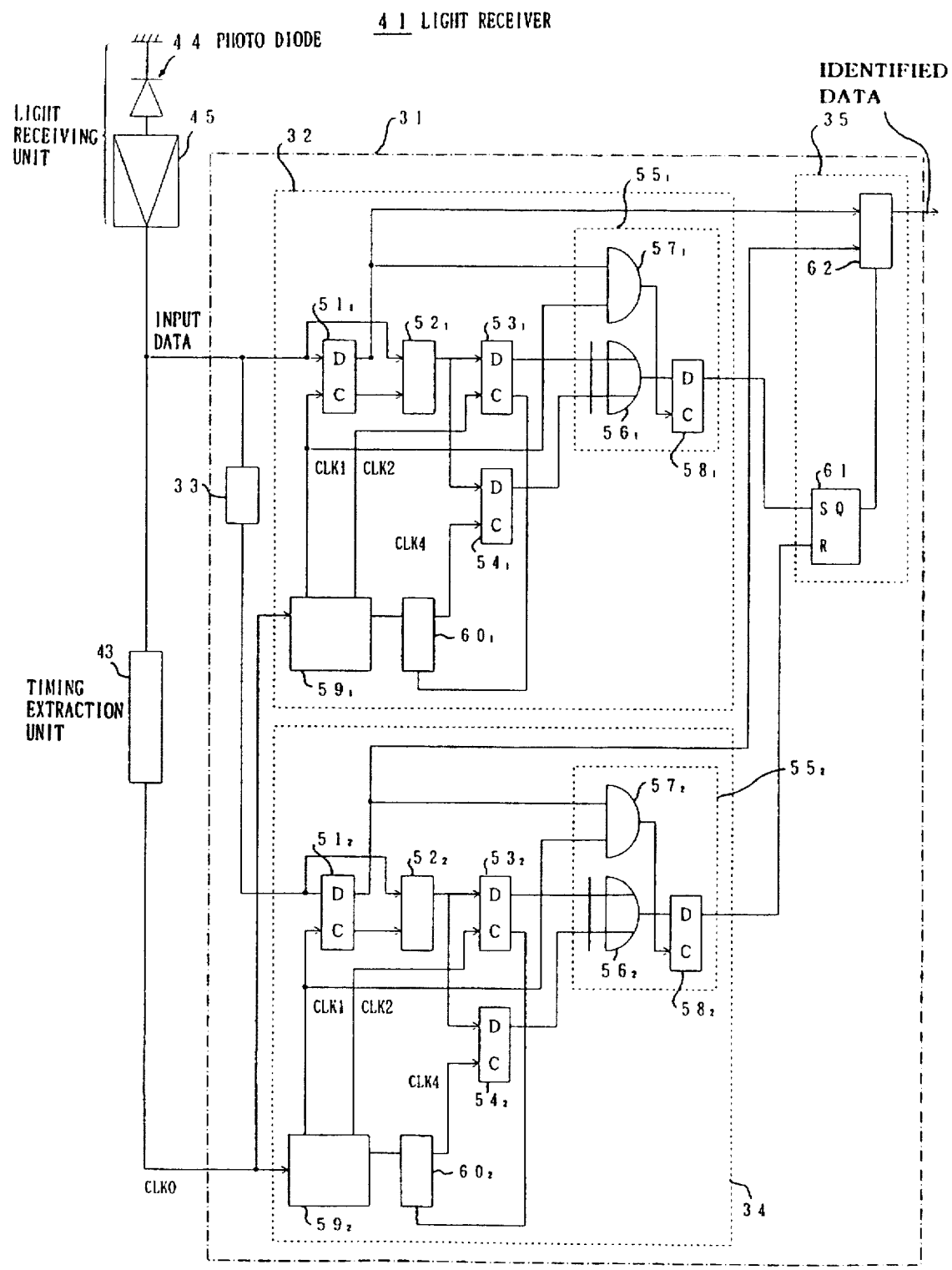
FIG. 4 is a block diagram of a light receiver according to a first embodiment of the present invention.

FIG. 4 is a block diagram of a light receiver according to a first embodiment of the present invention. A light receiver 41 of FIG. 4 may be used in an optical transit trunk provided in an optical-signal-transmission system.

Briefly, the light receiver 41 includes a light receiving unit 42, a timing extraction unit 43, and the data identifying device 31. The data identifying device 31, as shown in FIG. 3, includes the first identifying unit 32, the delay unit 33, the second identifying unit 34, and the selection unit 35.

The light receiving unit 42 includes a photodiode 44 as a light receiving element and an equalizer/amplifier unit 45. An optical signal transmitted through an optical fiber (not shown) is converted into an electric signal by the photodiode 44, and the equalizer/amplifier unit 45 amplifies the electric signal to an identifiable level.

An output signal of the equalizer/amplifier unit 45 is input data to the light receiver 41, and is applied to the timing extraction unit 43 which extracts a clock signal (CLK0) therefrom. This clock signal is supplied to the first identifying unit 32 and the second identifying unit 34. The input data is also applied to the first identifying unit 32, and applied to the second identifying unit 34 via the delay unit 33.

The first identifying unit 32 and the second identifying unit 34 may have the same configuration, in which clock signals having the same frequency are used for identifying the data and for determining the phase relations. The selection unit 35 selects appropriate identified data.

A description of an operation of the first identifying unit 32 will be given below, in which counterpart elements of the second identifying unit 34 are referred to in parentheses.

In the first identifying unit 32 (34), a D-FF (D flip-flop) $51_1$ ($51_2$) is an identifying part which identifies 0s and 1s in the input data by using a below-described clock signal. Here, a coding scheme of an output signal of the D-FF $51_1$ ($51_2$) is determined flexibly, so that a coding scheme of following D-FFs are determined accordingly. Thus, signals having any code scheme can be treated.

A phase-relation detecting unit $52_1$ ($52_2$) detects a phase relation between the input data and the identified data provided from the D-FF $51_1$ ($51_2$), which will be described later with reference to FIG. 5. Elements which are designated by reference numerals $53_1$ ($53_2$) and $54_1$ ($54_2$) are first and second phase-relation determining units, respectively, and are comprised of D-FFs, for example. The first and second phase-relation determining units $53_1$ ($53_2$) and $54_1$ ($54_2$) determine based on a phase relation between a clock signal and the data provided from the phase-relation detecting unit $52_1$ ($52_2$) whether a phase relation at the identifying part $51_1$ ($51_2$) is appropriate.

A processing unit $55_1$ ($55_2$) includes an EXOR (exclusive-OR) gate $56_1$ ($56_2$), an AND gate $57_1$ ($57_2$), and a D-FF $58_1$ ($58_2$), for example. The processing unit $55_1$ ($55_2$) processes phase-relation determination results provided from the first and second phase-relation determining units $53_1$ and ($53_2$) and $54_1$ ($54_2$), and generates information for selecting either one of the identified data from the first identifying unit 32 or from the second identifying unit 34.

A clock distribution unit $59_1$ ($59_2$) receives the clock signal CLK0, and distributes the clock signals to the identifying part $51_1$ ($51_2$), the phase-relation detecting unit $52_1$ ($52_2$), the first phase-relation determining unit $53_1$ ($53_2$), the AND gate $57_1$ ($57_2$) of the processing unit $55_1$ ($55_2$), and a phase controlling unit $60_1$ ($60_2$). The clock distribution unit $59_1$ ($59_2$) will be described with reference to FIG. 6.

The phase controlling unit $60_1$ ($60_2$) controls a phase of the clock signal provided to the second phase-relation determining unit $54_1$ ($54_2$) based on the output of the first phase-relation determining unit $53_1$ ($53_2$). The phase controlling unit $60_1$ ($60_2$) will be described later with reference to FIG. 7.

The selection unit 35 selects either one of the identified data from the first identifying unit 32 or the second identifying unit 34 based on the information regarding phase-relation determination results from the first identifying unit 32 and the second identifying unit 34. The selection unit 35 includes a SR-FF 61 and a multiplexer 62, for example. The SR-FF 61 receives the information from the D-FF $58_1$ ($58_2$) of the processing unit $55_1$ ($55_2$) and provides an output to the multiplexer 62. Based on this output from the SR-FF 61, the multiplexer 62 selects either one of the identified data from the first identifying unit 32 or the identified data from the second identifying unit 34 so as to output appropriate identified data.

FIGS. 5A through 5D are circuit diagrams of the phase-relation detecting unit $52_1$ ($52_2$) of FIG. 4. Each of FIGS. 5A through 5D shows a different circuit example of the phase-relation detecting unit $52_1$ ($52_2$), and an appropriate circuit among these may be used. The phase-relation detecting unit $52_1$ ($52_2$) receives two input signals, among which one is the input data and the other is the output from the identifying part $51_1$ ($51_2$). The output from the identifying part $51_1$ ($51_2$) is either Q or /Q (/Q hereinafter refers to an inverse of Q).

Figure 5A:
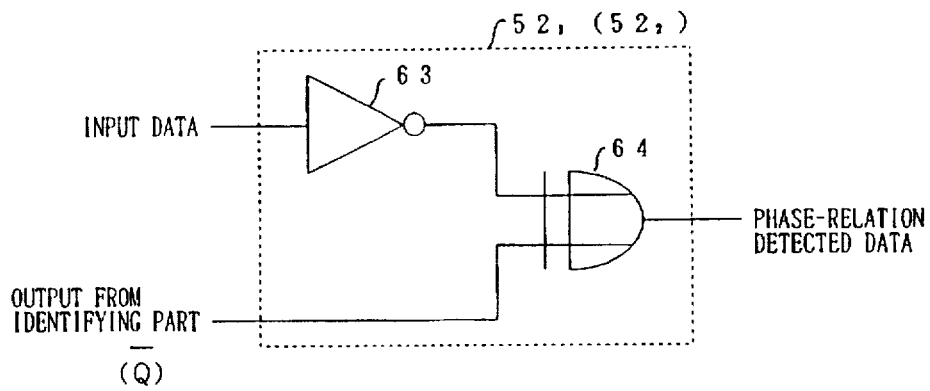
FIGS. 5A through 5D are circuit diagrams of a phase-relation detecting unit of FIG. 4.

FIG. 5A shows a configuration of the phase-relation detecting unit $52_1$ ($52_2$) which includes an inverter 63 and an EXOR gate 64. The inverter 63 receives the input data, and the EXOR gate 64 receives an output of the inverter 63 and an output /Q of the identifying part $51_1$ ($51_2$). In this circuit configuration, a high-level output is obtained when the input data is "1" and the output /Q is "0".

Figure 5B:
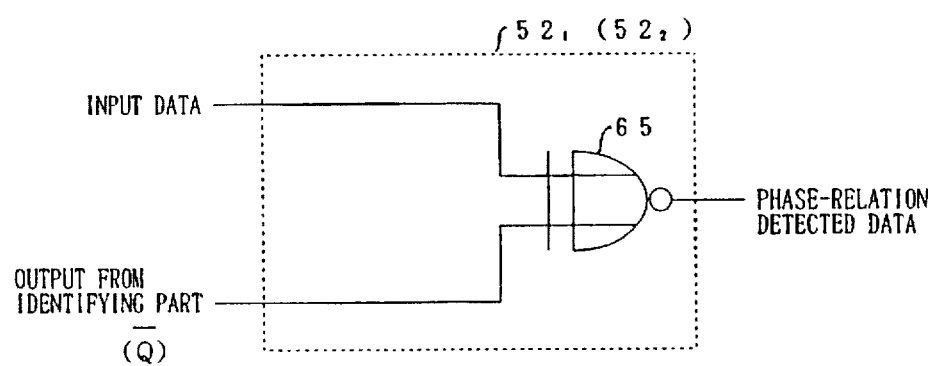

FIG. 5B shows a configuration of the phase-relation detecting unit $52_1$ ($52_2$) which includes a NOR gate 65. The NOR gate 65 receives the input data and the output /Q of the identifying part $51_1$ ($51_2$). In this circuit configuration, a high-level output is obtained when the input data is "0" and the output /Q is "0".

Figure 5C:
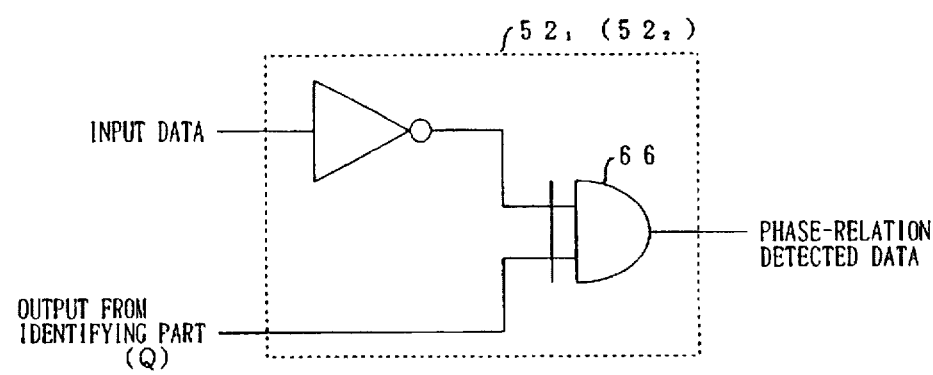

FIG. 5C shows a configuration of the phase-relation detecting unit $52_1$ ($52_2$) which includes the inverter 63 and an AND gate 66. The inverter 63 receives the input data, and the AND gate 66 receives an output of the inverter 63 and an output Q of the identifying part $51_1$ ($51_2$). In this circuit configuration, a high-level output is obtained when the input data is "0" and the output Q is "1".

Figure 5D:
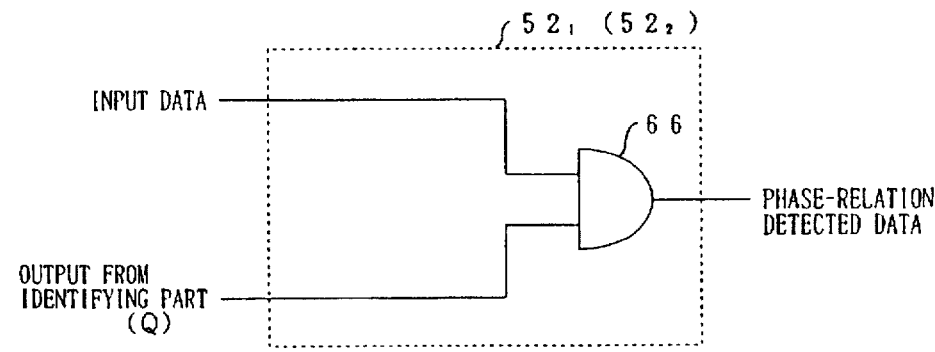

FIG. 5D shows a configuration of the phase-relation detecting unit $52_1$ ($52_2$) which includes the AND gate 66. The AND gate 66 receives the input data and the output Q of the identifying part $51_1$ ($51_2$). In this circuit configuration, a high-level output is obtained when both the input data and the output Q are "1".

Figure 6A:
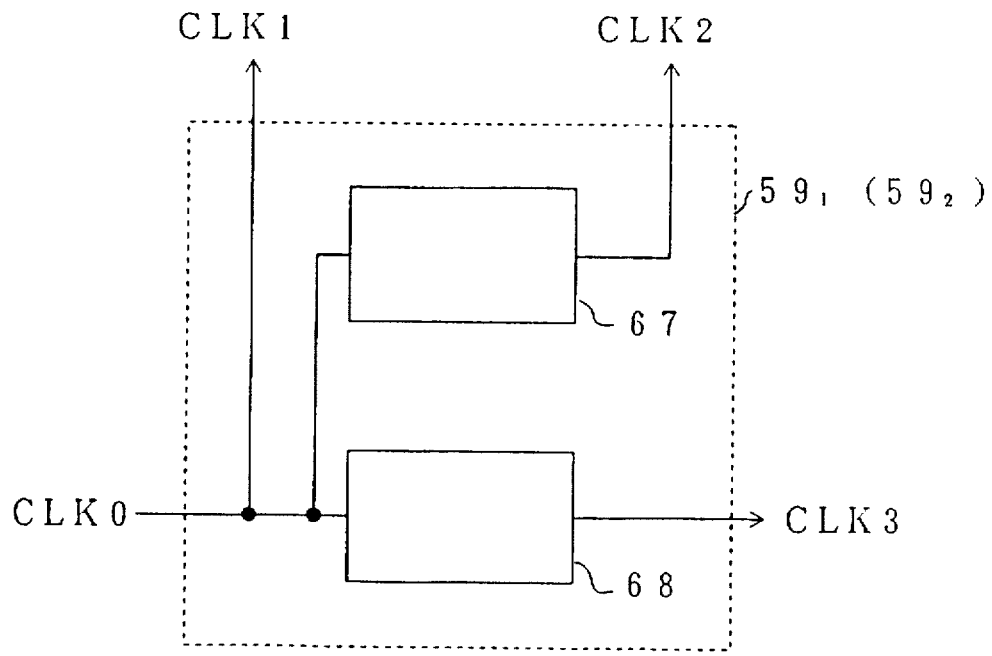
FIGS. 6A and 6B are block diagrams of a clock distribution unit of FIG. 4.
Figure 6B:
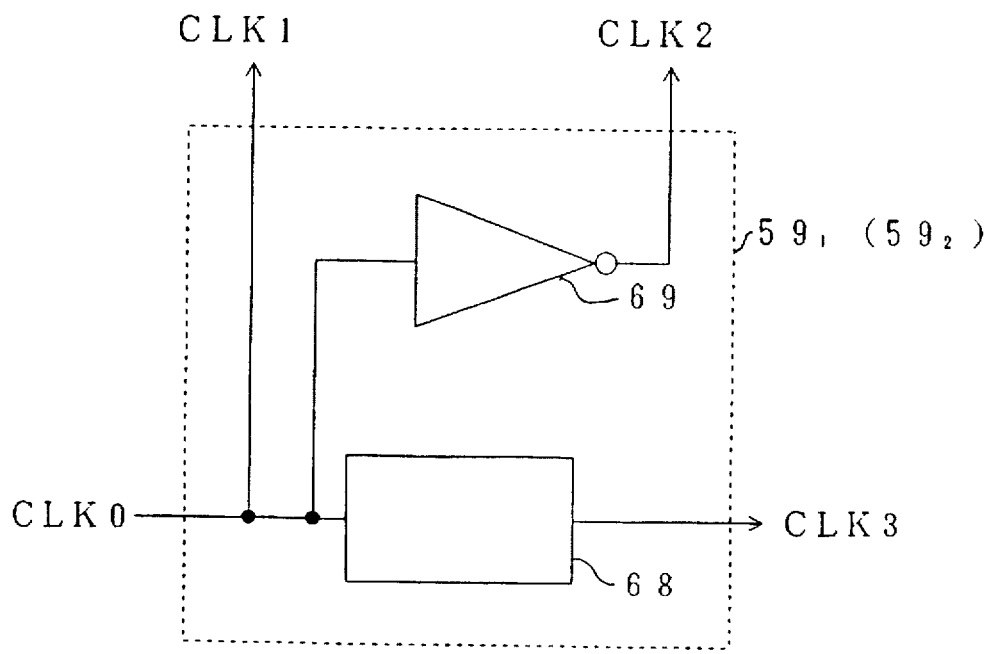

FIGS. 6A and 6B are block diagrams of the clock distribution unit $59_1$ ($59_2$) of FIG. 4. Each of FIGS. 6A and 6B shows a circuit example of the clock distribution unit $59_1$ ($59_2$) and an appropriate circuit among these two may be used.

FIG. 6A shows a configuration of the clock distribution unit $59_1$ ($59_2$) which includes a first delay unit 67 and a second delay unit 68. The clock signal CLK0 from the timing extraction unit 43 of FIG. 4 is supplied to the clock distribution unit $59_1$ ($59_2$), and a clock signal CLK1 having the same phase as the clock signal CLK0 is provided to a clock node (C) of the identifying part (D-FF) $51_1$ ($51_2$) and to the AND gate $57_1$ ($57_2$) of the processing unit $55_1$ ($55_2$).

A clock signal CLK2 having a pulse width of one time slot T which is delayed by a predetermined phase amount (e.g., T/2) by the first delay unit 67 is provided to a clock node (C) of the phase-relation determining unit (D-FF) $53_1$ ($53_2$). A clock signal CLK3 which is delayed by a predetermined phase amount (e.g., T/4 or 3T/4) is provided to the phase controlling unit $60_1$ ($60_2$).

FIG. 6B shows another configuration of the clock distribution unit $59_1$ ($59_2$) in which an inverter 69 serving as a delay unit replaces the first delay unit 67 of FIG. 6A. The rest of the configuration is the same as that of FIG. 6A. That is, the clock signals CLK1 and CLK2 which are inverted signals of each other (or signals delayed from each other) are provided to the identifying part $51_1$ ($51_2$) and the phase-relation determining unit $53_1$ ($53_2$) respectively.

In FIGS. 6A and 6B, the first delay unit 67 and the second delay unit 68 are comprised of logical gate devices, or comprised of fixed or variable delay elements (passive elements).

Figure 7A:
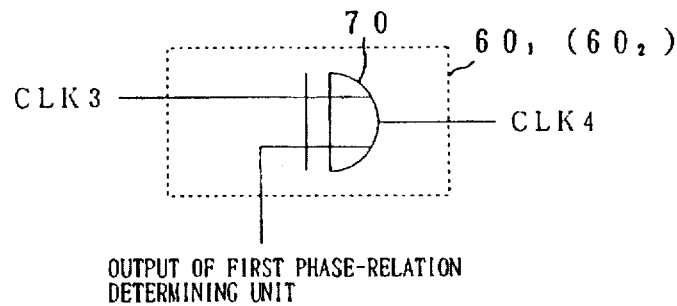
FIGS. 7A through 7C are circuit diagrams of examples of a phase controlling unit of FIG. 4.
Figure 7B:
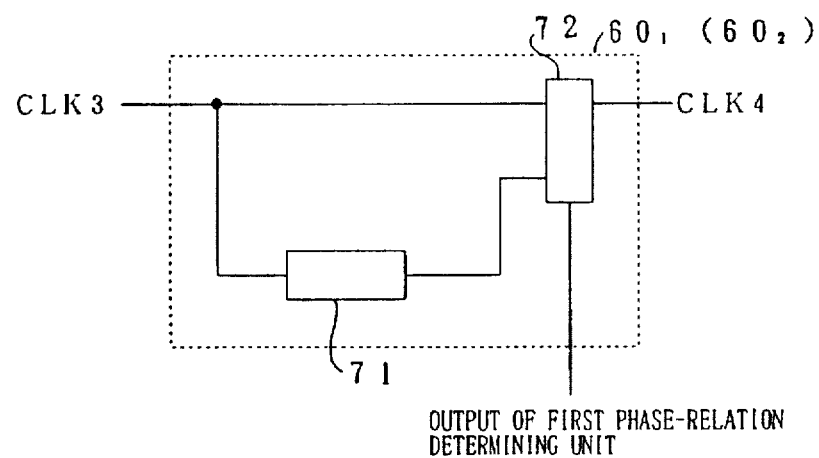
Figure 7C:
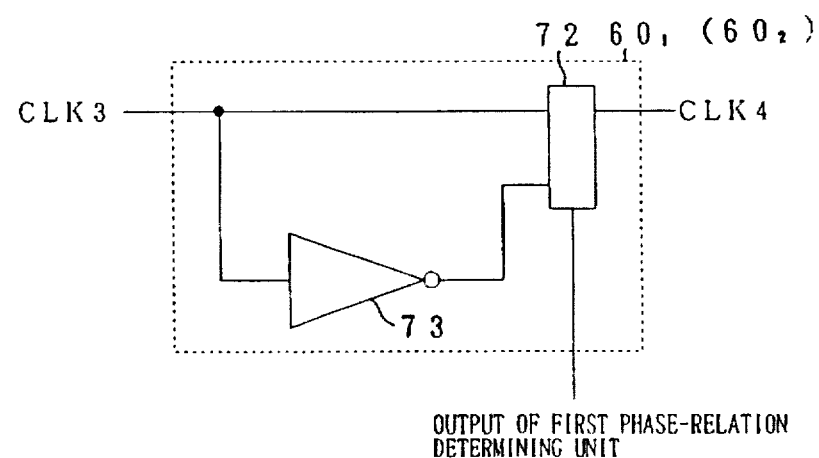

FIGS. 7A through 7C are circuit diagrams of examples of the phase controlling unit $60_1$ ($60_2$) of FIG. 4.

FIG. 7A shows a configuration of the phase controlling unit $60_1$ ($60_2$) which includes an EXOR 70 receiving two inputs and serving as a delay unit also. The EXOR 70 receives the clock signal CLK3 from the clock distribution unit $59_1$ ($59_2$) and the output signal of the first phase-relation determining unit $53_1$ ($53_2$), and generates a clock signal CLK4. Thus, the EXOR 70 either passes the clock signal CLK3 provided from the clock distribution unit $59_1$ ($59_2$) without making any changes, or inverts (delays, in other words) the clock signal CLK3 before outputting an inverted clock signal, depending on the output signal of the first phase-relation determining unit $53_1$ ($53_2$). In this manner, the phase controlling unit $60_1$ ($60_2$) controls the phase of the clock signal CLK4 which is provided for the second phase-relation determining unit $54_1$ ($54_2$).

FIG. 7B shows a configuration of the phase controlling unit $60_1$ ($60_2$) which includes a delay unit 71 and a multiplexer (or selector) 72. The first delay unit 71 is made up from a gate device, or made up from fixed or variable delay elements (passive elements). The delay unit 71 delays the clock signal CLK3 provided from the clock distribution unit $59_1$ ($59_2$). Then, based on the output signal of the first phase-relation determining unit $53_1$ ($53_2$), the multiplexer 72 selects either the clock signal CLK3 or a clock signal delayed by the delay unit 71 so as to control the phase of the clock signal CLK4, which is provided for the second phase-relation determining unit $54_1$ ($54_2$).

FIG. 7C shows a configuration of the phase controlling unit $60_1$ ($60_2$) in which an inverter 73 serving as a delay unit replaces the delay unit 71 of FIG. 7B. The rest of the configuration is the same as that of FIG. 7B. The inverter 73 inverts the clock signal CLK3 provided from the clock distribution unit $59_1$ ($59_2$). Then, based on the output signal of the first phase-relation determining unit $53_1$ ($53_2$), the multiplexer 72 selects either the clock signal CLK3 or an inverted clock signal so as to control the phase of the clock signal CLK4, which is provided for the second phase-relation determining unit $54_1$ ($54_2$).

In the following, an operation of the data identifying device 31 of FIG. 4 will be described briefly. The photodiode 44 of the light receiving unit 42 receives a transmitted light, and a received signal is amplified by the equalizer/amplifier unit 45 to be supplied as the input data to the identifying part $51_1$ ($51_2$). The timing extraction unit 43 extracts the clock signal CLK0 from the input data, and provides it to the clock distribution unit $59_1$ ($59_2$). Then, the clock distribution unit $59_1$ ($59_2$) generates a predetermined number of clock signals (i.e., the clock signals CLK1 through CLK3 in FIG. 4).

The identifying part $51_1$ of the first identifying unit 32 receives the input data. The identifying part $51_2$ of the second identifying unit 34 receives the input data delayed by the delay unit 33.

The identifying unit 32 (34) identifies the input data by using the clock signal CLK1 which is provided from the clock distribution unit $59_1$ ($59_2$). Then, a check is made whether the input data is identified while a predetermined phase relation is kept between the clock signal CLK1 and the input data. The identified data and the result of the check are applied to the selection unit 35. Based on the result of the check, the selection unit 35 selects appropriate identified data from the identified data provided from the first identifying unit 32 and the identified data provided from the second identifying unit 34.

In the configuration of FIG. 4, the identifying part $51_1$ ($51_2$) of the identifying unit 32 (34) identifies the input data, and, then, the phase-relation detecting unit $52_1$ ($52_2$) generates a signal representing a phase relation between the identified data and the input data as a pulse width. Then, the first phase-relation determining unit $53_1$ ($53_2$) and the second phase-relation determining unit $54_1$ ($54_2$) determine the phase relation from this signal by using the clock signals CLK2 and CLK4, which are provided from the clock distribution unit $59_1$ ($59_2$) and the phase controlling unit $60_1$ ($60_2$), respectively.

When the phase relation is represented by a pulse width, the phase relation can be determined based on a signal having a high level or a low level depending on whether the pulse width corresponding to the phase relation is wider than a predetermined width. The results of the determination process are processed in the processing unit $55_1$ ($55_2$), which in turn generates a control signal used in the selection process by the selection unit 35. Here, the phase of the clock signal used by the second phase-relation determining unit $54_1$ ($54_2$) is changed according to the output of the first phase-relation determining unit $53_1$ ($53_2$).

FIGS. 8A through 8L are time charts showing an operation of the data identifying device 31 of FIG. 4. In an example of FIGS. 8A through 8L, the phase-relation detecting unit $52_1$ ($52_2$) is comprised as shown in FIG. 5C. As shown by hatched areas in FIG. 8A, the input data applied to the data identifying device 31 has time periods in which the input data cannot be identified because of an extension of a setup/hold time or because of jitters of the clock signal and/or data signal. FIGS. 8A through 8L show a case in which pulses of the clock signal CLK1 do not exist in these unidentifiable periods. For example, FIGS. 8A through 8L can be regarded as showing an operation of the first identifying unit 32 of FIG. 4, and an operation of the second identifying unit 34 will be described later.

The identifying part $51_1$ identifies the input data (FIG. 8A) by using the clock signal of FIG. 8B to generate the identified data (FIG. 8C). The phase-relation detecting unit $52_1$ generates a phase-relation pulse (FIG. 8D) representing a phase relation between the identified data (FIG. 8C) and the input data (FIG. 8A). The first phase-relation determining unit $53_1$ identifies the phase-relation pulse (FIG. 8D) by using the clock signal CLK2 (FIG. 8E) provided from the clock distribution unit $59_1$. The first phase-relation determining unit $53_1$ determines whether the clock signal CLK1 is ahead of or delayed from a predetermined phase relation with the input data. In this example, the clock signal CLK1 is ahead of, so that a first phase relation generated by the first phase-relation determining unit $53_1$ remains at a low level as shown in FIG. 8F.

The second phase-relation determining unit $54_1$ identifies the phase-relation pulse (FIG. 8D) by using the clock signal CLK4 (FIG. 8G), which is delayed by a predetermined phase amount from the clock signal CLK2 by the phase controlling unit $60_1$. In this example, the clock signal CLK1 is positioned in an identifiable area of the input signal, so that the phase-relation pulse has a pulse width which is sufficiently wide to be identified. Thus, a second phase relation generated by the second phase-relation determining unit $54_1$ becomes a high level (FIG. 8H).

The first phase relation (FIG. 8F) and the second phase relation (FIG. 8H) which are generated by the first phase-relation determining unit $53_1$ and the second phase-relation determining unit $54_1$ respectively, are provided to the EXOR gate $56_1$ of the processing unit $55_1$. The EXOR gate $56_1$ generates a signal (FIG. 8I) which is at a high level when these two input signals are at different levels. The AND gate $57_1$ of the processing unit $55_1$ receives the identified data from the identifying part $51_1$ and the clock signal CLK1 from the clock distribution unit $59_1$ at the same timing as the EXOR gate $56_1$ receives its two inputs. This concurrence of timing is brought about by a time delay of one clock cycle occurring through signal propagation. The AND gate $57_1$ generates a checking clock (FIG. 8J), which is the clock signal CLK1 passed through the AND gate $57_1$ when the identified data from the identifying part $51_1$ is at the high level.

The checking clock (FIG. 8J) is applied to a clock node (C) of the D-FF $58_1$ of the processing unit $55_1$ and the output of the EXOR gate $56_1$ is applied to a data node (D) of the D-FF $58_1$. The D-FF $58_1$ supplies a phase-relation determination result (FIG. 8K) to a set node (S) of the SR-FF 61 of the selection unit 35. In FIG. 8K (and FIG. 8L), hatched areas show time periods in which signal levels are not determined in this example. A reset node (R) of the SR-FF 61 receives another phase-relation determination result from the second identifying unit 34, which will be described later. The multiplexer 62 outputs the identified data (FIG. 8L) when the identified data of the first identifying unit 32 is selected according to an output of the SR-FF 61.

In this manner, the fact that the first phase relation and the second phase relation obtained by the first phase-relation determining unit $53_1$ and the second phase-relation determining unit $54_1$, respectively, are at different signal levels means that the clock signal CLK1 is positioned within a predetermined time interval so as to permit an appropriate identifying operation. Thus, the identified data is selected as appropriate.

FIGS. 9A through 9K are time charts showing another operation of the data identifying device 31 of FIG. 4. An example of FIGS. 9A through 9K show a case in which the clock signal CLK1 is positioned in an unidentifiable time period of the input data. For example, FIGS. 9A through 9K can be regarded as showing an operation of the second identifying unit 34 which receives the input data delayed by a phase amount T/2 in comparison with the example of FIGS. 8A through 8L.

The clock signal CLK1 (FIG. 9B) used by the identifying part $51_2$ is positioned within the unidentifiable time period in the time slot (pulse) T of the input data (FIG. 9A). The phase-relation detecting unit $52_2$ generates the phase-relation pulse (FIG. 9D) by using the input data (FIG. 9A) and the identified data (FIG. 9C) from the identifying part $51_2$. Then, the first phase-relation determining unit $53_2$ identifies the phase-relation pulse (FIG. 9D) by using the clock signal CLK2 having a phase delay T/2 compared with the clock signal CLK1, so as to generate the first phase relation (FIG. 9F). That is, the clock signal CLK2 has a rising edge while the phase-relation pulse (FIG. 7D) is at the high level, so that the first phase-relation determining unit $53_2$ generates a pulse lasting until the next rising edge of the clock signal CLK2.

In the same manner, the second phase-relation determining unit 54 obtains the second phase relation by using the phase-relation pulse (FIG. 9D) and the clock signal CLK4 (FIG. 9G) from the phase controlling unit $60_2$. Here, the clock signal CLK4 maintains a predetermined phase difference with the clock signal CLK2, except for a time period when the phase difference is changed according to the signal level of the first phase relation. In this example, the second phase relation becomes the high level as shown in FIG. 9H.

The EXOR gate $56_2$ receives the first and second phase relations (FIG. 9F and 9H, respectively), and generates a pulse (FIG. 9I) during a time period when the first and second phase relations have different signal levels because of a difference in the pulse widths thereof.

At the same time, the AND gate 57 of the processing unit 55₂ generates the checking clock (FIG. 9J) by using the identified data (FIG. 9C) and the clock signal CLK1 (FIG. 9B). The checking clock (FIG. 9J) is delayed by one clock cycle because of a delay in signal propagation. The D-FF 58₂ identifies the output of the EXOR gate 56₂ by using the checking clock (FIG. 9J) to generate the phase-relation determination result (FIG. 9K). Since the first and second phase relations have the same signal level when the checking clock (FIG. 9J) has a rising edge, the phase-relation determination result (FIG. 9K) remains at the low level.

Thus, the SR-FF 61 of the selection unit 35 receives the low-level signal at the reset node (R) thereof, so as to generate a high level signal at an output node (Q) thereof. As a result, the multiplexer 62 selects the identified data provided from the first identifying unit 32.

In this manner, when a clock pulse of the clock signal CLK1 used for identifying the input data is positioned within the time slot T but positioned outside the predetermined identifiable time period, both of the first and the second phase relations are at the high level so that the phase-relation determination result becomes the low level. When the phase-relation determination result is at the low level, it is determined that the clock signal CLK1 is not within the predetermined identifiable time period of the input data to permit an appropriate identifying operation. In this case, the identified data obtained by using the input data of another timing (as in the first identifying unit 32) is selected as appropriate.

The selection at the multiplexer 62 is made by using the signal level (high or low) of the output signal of the SR-FF 61, i.e., by using the signal level of the output signals of the D-FFs 58₁ and 58₂ provided in the processing unit 55₁ and 55₂, respectively. As described above, the identified data from the first identifying unit 32 is selected in the above examples.

As can be seen from the above example, the identifying clock (clock signal CLK1) does not have a predetermined phase relation with the input data in the first identifying unit 32 nor the second identifying unit 34. However, when the first identifying unit 32 and the second identifying unit 34 have the same configuration as shown in FIG. 4, a range of the phase difference between the input data to the first identifying unit 32 and the input data to the second identifying unit 34 can be determined by a bit rate of the input data. This will be described below.

Figures 10A, 10B, 10C:
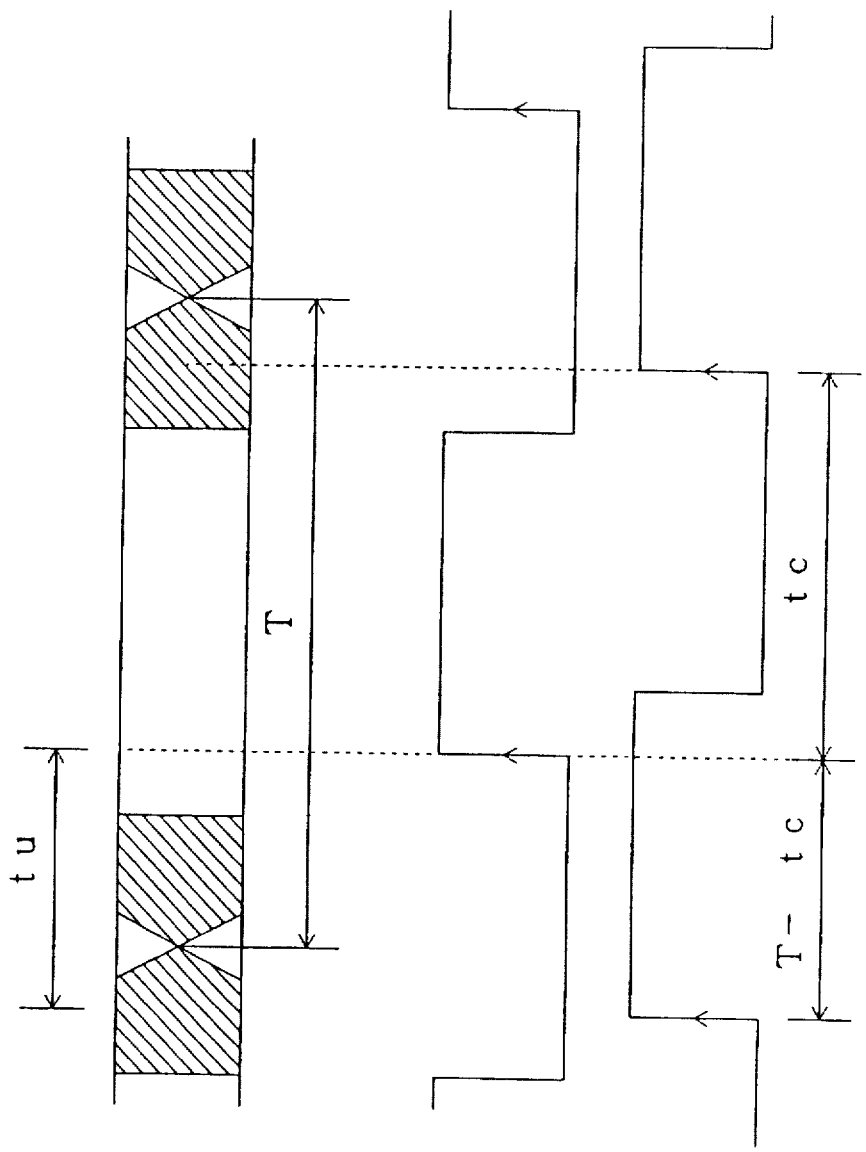
FIGS. 10A through 10C are time charts for explaining a phase difference between an identifying clock and input data.

FIGS. 10A through 10C are time charts for explaining the phase difference between the identifying clock and the input data. FIG. 10A shows the input data, FIG. 10B shows the identifying clock signal having a certain phase relation with the input data, and FIG. 10C shows the identifying clock signal having another phase relation with the input data. In the figures, one time slot (clock pulse period) is T, a phase difference between the two clock signals shown in FIGS. 10B and 10C is tc, and a time length of the unidentifiable time period (e.g., caused by jitters, setup hold time, etc.) is tu. FIGS. 10A through 10C are shown as if there was a phase difference in the clock signals. However, it should be noted that a phase difference actually exists between the input data applied to one identifying unit and the input data applied to another identifying unit in the example of FIG. 4.

Since at least one of the two clock signals should be positioned outside the unidentifiable time period, the following relations are required.

$$tu \leq tc \quad (1)$$

$$tu \leq (T-tc) \quad (2)$$

Thus, a condition, $$tu \leq tc \leq (T-tu) \quad (3)$$

is obtained. The condition (3) can be modified as follows.

$$2tu \leq tc+tu \leq T \quad (4)$$

A condition of the fastest data speed is equal to a condition of the smallest T. As shown in the condition (4), T becomes the smallest when tc is equal to tu, under which condition T is twice the time length of the unidentifiable time period. Under a condition of using the fastest data speed, thus, the phase difference tc between the input data given to the first identifying unit 32 and the input data given to the second identifying unit 34 is T/2 (half the length of the time slot), of course, even when the data speed is not fastest (i.e., the unidentifiable time period tu is less than T/2), the phase difference tc equal to T/2 satisfies the condition (3).

When the data speed of the input data is 622 Mb/s, for example, the phase difference may be set to 804 ps (=1/622 Mbps/2).

A phase relation between the clock signal CLK1 (FIG. 8B and FIG. 9B) used for identifying the input signal (FIG. 8A and FIG. 9A) and the clock signal CLK2 (FIG. 8E and FIG. 9E) used for identifying the phase-relation pulse (FIG. 8D and FIG. 9D) will be described below.

As shown in FIG. 8D and FIG. 9D, the phase-relation pulse extends from a trailing edge of a identified pulse of the input data (FIG. 8A and FIG. 9A) to a leading edge of a pulse of the clock signal CLK1 (FIG. 8B and FIG. 9B) whose immediately preceding pulse is used to identify the above-identified pulse. That is, the phase-relation pulse starts at a point somewhere between two adjacent leading edges of the clock signal CLK1, and ends at the latter one of the two adjacent leading edges. The clock signal CLK2 (FIG. 8E and FIG. 9E) is used for identifying the phase-relation pulse to generate the first phase relation (FIG. 8F and FIG. 9F). Thus, if a phase difference between the clock signal CLK1 and the clock signal CLK2 is set to T/2 (the time slot T is assumed to be equal to the clock pulse interval), the first phase relation can indicate whether the phase-relation pulse exists in a former half of the interval between the two adjacent edges. In other words, the first phase relation can indicate whether the phase difference between the input data and the clock signal CLK1 is larger than T/2. Thus, setting the phase difference between the clock signal CLK1 and the clock signal CLK2 to T/2 results in the first phase relation serving as an indicator whether the phase difference between the input data and the clock signal CLK1 is larger than T/2.

A phase relation between the clock signal CLK1 (FIG. 8B and FIG. 9B) used for identifying the input signal (FIG. 8A and FIG. 9A) and the clock signal CLK4 (FIG. 8G and FIG. 9G) for identifying the phase-relation pulse (FIG. 8D and FIG. 9D) to generate the second phase relation will be described below.

As described with reference to the clock signal CLK2, the clock signal CLK2 identifying the phase-relation pulse results in a determination whether the identifying clock (clock signal CLK1) is positioned in the first half of the time slot of the input data or positioned in the second half of the time slot. In order to determine further in detail the position of the clock signal CLK1 (FIG. 8B and FIG. 9B) within the first half or within the second half of the input data (FIG. 8A and FIG. 9A), a relative phase of the clock signal CLK4

(FIG. 8G and FIG. 9G) is changed according to the first phase relation generated by using the clock signal CLK2. By using this clock signal CLK4, the phase-relation pulse (FIG. 8D and FIG. 9D) is identified.

A phase of the clock signal CLK4 changed according to the first phase relation should be shifted at least T/2 for the fastest bit rate of the input data. In this manner, the two clock signals CLK1 and CLK4 can function in symmetry.

As described above, it is determined whether the identifying clock (clock signal CLK1 shown in FIG. 8B and FIG. 9B) is positioned in the first half or in the second half of the one time slot of the input data (FIG. 8A and FIG. 9A). In the same manner, the phase relation between the input data and the identifying clock is further determined within the first half or within the second half of the time slot by using the phase relation between the clock signals CLK2 and CLK4.

Thus, the phase difference between the clock signals CLK2 and CLK4 should be set to at least T/4 (half of T/2) for the fastest bit rate of the input data. In this case, the clock signal CLK4 having two different phases can function in symmetry when used for identifying the phase-relation pulse in the second phase-relation determining unit $54_1$ ($54_2$). Thus, the bit rate of the input data can be designed to be at its fastest rate.

When the identifying device 31 is formed from a circuit performing logical operations by using gate arrays which have stable characteristics and are available at a low price, operation conditions of such a circuit may be inconsistent with the design tools or the simulation tools. Since the input data and the clock signal are processed to detect the phase relation without being synchronized in the identifying circuits, signal waveforms observed in the identifying circuits at the time of a circuit design are dependent on the input data and the clock signals. Thus, an operation becomes difficult in a simulation of internal waveform responses.

Also, a phase relation between the clock signal and the signal supplied to the phase-relation determining units $53_1$ ($53_2$) and $54_1$ ($54_2$) is unstable. Thus, when errors such as identification errors or undeterminable phases are generated due to the setup-hold time in the phase-relation determining units using the D-FFs, a general simulation tool cannot simulate signal waveforms appearing in subsequent locations in signal paths after the phase-relation determining unit which caused an error. As a result, a problem arises that the identifying device cannot be implemented as a low-price gate-array circuit suitable for mass-production, impeding an effort to form the entire device with logic circuits.

In order to obviate this problem, a portion which performs logical synchronization processes are formed from gate arrays or from general-purpose ASICs such as standard cells, while circuits for which the undeterminability of signal waveforms becomes a problem or circuits which are susceptible to effects of undeterminability of the phase relation between the input signal and the clock signal are formed from discrete logic circuits. (Here, a discrete logic circuit is a circuit which is comprised of discrete elements (devices).) The circuits for which the undeterminability of signal waveforms becomes a problem include the identifying part $51_1$ ($51_2$) and the phase-relation detecting unit $52_1$ ($52_2$). The circuits which are susceptible to the effects of undeterminability of the phase relation between the input signal and the clock signal include the phase-relation determining units $53_1$ ($53_2$) and $54_1$ ($54_2$).

In this manner, simulations of the entire device during the time of the circuit design become possible to facilitate the product development. Also, since most of the device is implemented using gate arrays, the devices may be mass produced cost effectively.

Also, depending on the gate-array process, a precise setting of delay may not be possible for the delay unit 33, which provides the phase delay for the input data of the first identifying unit 32 and the second identifying unit 34. Thus, the delay unit 33 can also be implemented using discrete logic circuits to make possible a precise setting of delay. Then, the identifying device 31 can deal with faster signals. Also, forming the delay unit 33 as a variable delay circuit enables an adjustment of the delay in accordance with a transmission bit rate and transmission-system characteristics, thereby enhancing the flexibility of the device.

Figure 11:
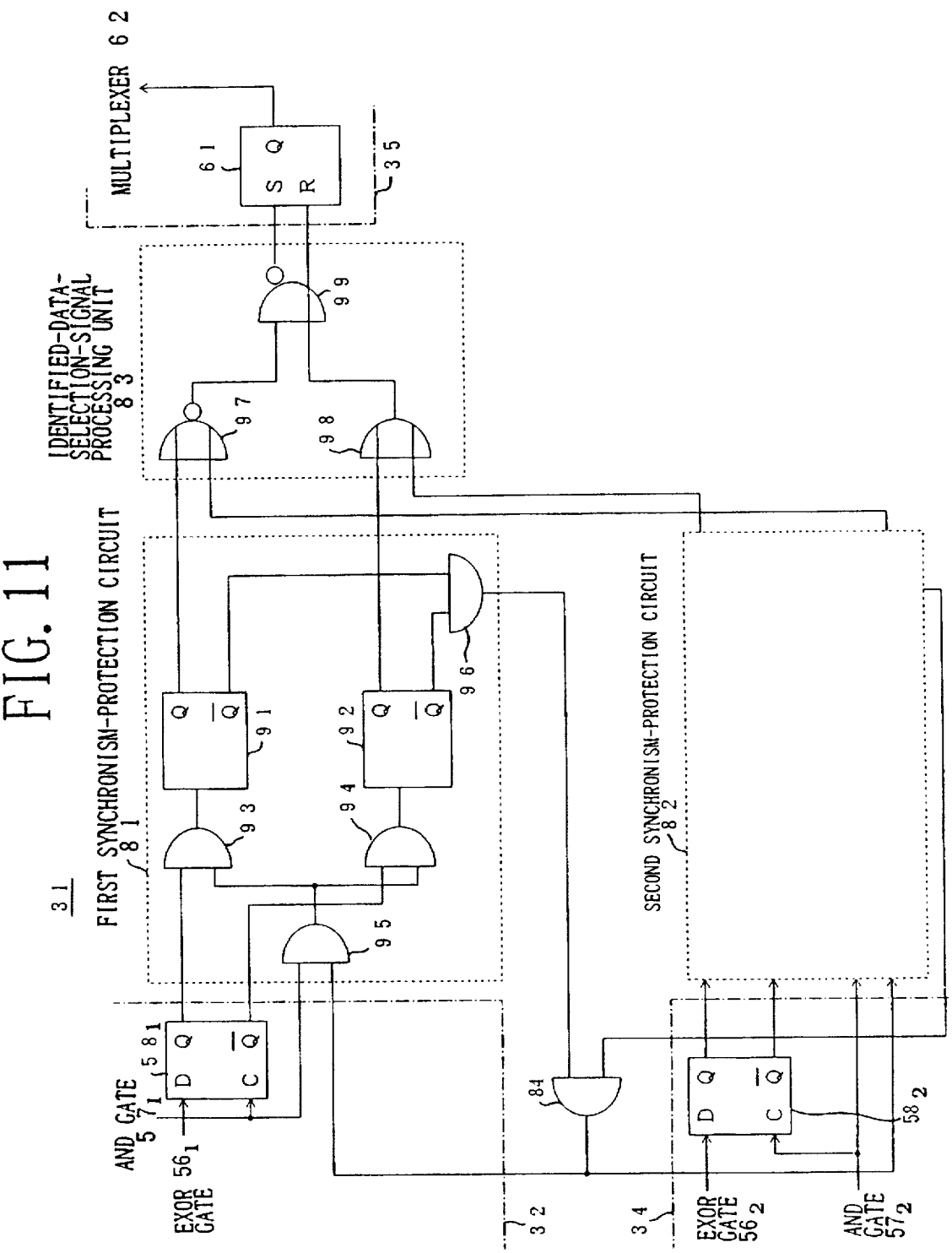
FIG. 11 is a block diagram of a light receiver according to a second embodiment of the present invention.

FIG. 11 is a block diagram of a light receiver according to a second embodiment of the present invention. In the first embodiment, the light receiver 41 uses the input data branched into two signals having different phases, and selects the identified data which is generated based on a clock signal having an appropriate relative phase. In general, light receivers use frame-synchronization circuits which are provided with synchronism-protection circuits. The second embodiment shown in FIG. 11 includes the synchronism-protection circuits in accordance with general practice.

In FIG. 11, first and second synchronism-protection circuits 81 and 82 and an identified-data-selection-signal processing unit 83 are provided between the selection unit 35 and each of the first and second identifying units 32 and 34. Also, an AND gate 84 is provided (described later). The second synchronism-protection circuit 82 has the same configuration as the first synchronism-protection circuit 81, and an inside circuit structure thereof is omitted in FIG. 11.

The synchronism-protection circuit 81 (82) includes a first counter 91 and a second counter 92 which correspond to the D-FF $58_1$ ($58_2$) of the first (second) identifying unit 32 (34).. The synchronism-protection circuit 81 (82) also includes the AND gates 93 through 95 for applying count signals (output signals Q and /Q of the D-FF $58_1$ ($58_2$)) to the first and second counters 91 and 92, and for resetting the same. Also, the synchronism-protection circuit 81 (82) includes an AND gate 96 which generates a signal for stopping a counting operation by using /Q outputs of the first and second counters 91 and 92.

The identified-data-selection-signal processing unit 83 includes a NOR gate 97, an OR gate 98, and an OR/NOR gate 99.

The first counter 91 of the synchronism-protection circuit 81 (82) receives the Q output of the D-FF $58_1$ ($58_2$) as a count signal via the AND gate 93. The second counter 92 of the synchronism-protection circuit 81 (82) receives the /Q output of the D-FF $58_1$ ($58_2$) as a count signal via the AND gate 94. The /Q outputs of the first and second counters 91 and 92 are generated when a predetermined number is counted, and are provided to the AND gates 93 and 94 as a counting-operation control signal via the AND gate 96, the AND gate 84, and the AND gate 95. Here, the other input node of the AND gate 95 receives the output signal of the AND gate $57_1$ ($57_2$) of the processing unit $55_1$ ($55_2$).

The Q output of the first counter 91 which is generated at a predetermined count is applied to the NOR gate 97 of the identified-data-selection-signal processing unit 83, and the Q output of the second counter 92 which is generated at a predetermined count is applied to the OR gate 98 of the identified-data-selection-signal processing unit 83. Outputs of the NOR gate 97 and the OR gate 98 are applied to the OR/NOR gate 99. A NOR output of the OR/NOR gate 99 is applied to the set node (S) of the SR-FF 61 of the selection unit 35, while an OR output of the OR/NOR gate 99 is applied to the reset node (R) of the SR-FF 61.

In this manner, the first and second counters 91 and 92 of the synchronism-protection circuit 81 (82) count two opposite pieces of the output data provided from the D-FF $58_1$ ($58_2$). Thus, not only the first counter 91 counts the number of identification operations of an appropriate phase relation, but also the second counter 92 counts the number of identification operations of an inappropriate phase relation. When the number of identification operations of an inappropriate phase relation exceeds a predetermined count, the identified-data-selection-signal processing unit 83 comprising the NOR gate 97, the OR gate 98, and the OR/NOR gate 99 is controlled such that the identified data based on a clock signal of an inverse phase is selected. In this manner, the phase relations for identifying the input data is sure to be determined for the input data having a predetermined data length.

There are two counters 91 and 92 provided in each of the two pathways corresponding to the first and second synchronism-protection circuits 81 and 82. Thus, there are four counters in total. When one of these four counters generates the Q output of the high level, the output of the AND gate 84 becomes the low level. When this happens, the pulse signals applied to the counters 91 and 92 are stopped so as to keep once stabilized phase unchanged.

The phase relation between the input data and the identifying clock may be changed because of temporal changes in operation conditions even after the appropriate identified data is selected. Thus, there may be a case in which the identified data selected by the selection unit 35 becomes inappropriate. Accordingly, a design of the device must take into account the changes in the phase relation between the input data and the identifying clock in order to cope with a system with unstable phase relations.

Figure 12:
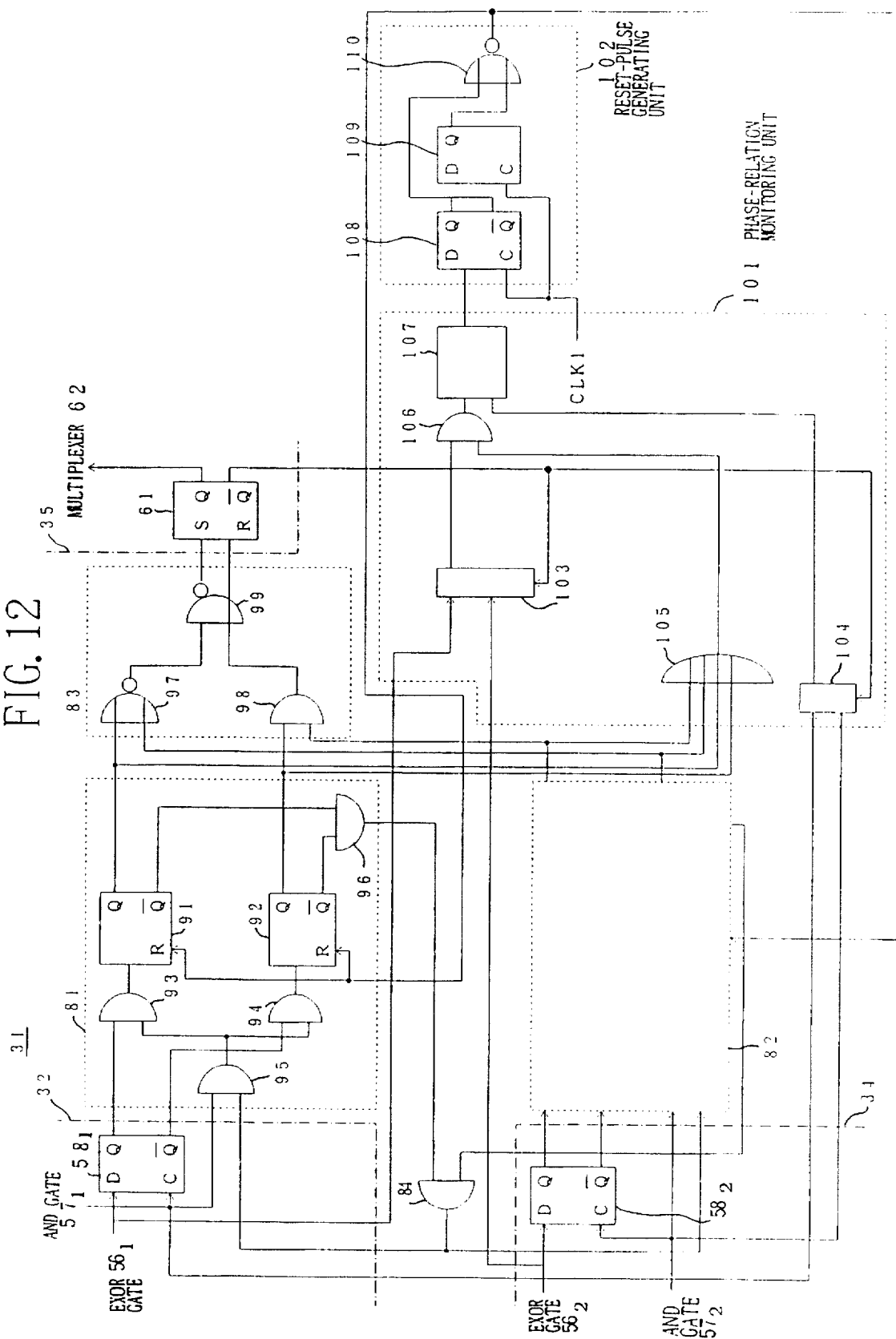
FIG. 12 is a block diagram of a data identifying device according to a third embodiment of the present invention.

FIG. 12 is a block diagram of the data identifying device 31 according to a third embodiment of the present invention. The data identifying device 31 of FIG. 12 is provided with a phase-relation monitoring unit 101 and a reset-pulse generating unit 102 in addition to the circuit configuration of FIG. 11.

The phase-relation monitoring unit 101 includes a first selector 103, a second selector 104, a 4-input OR gate 105, an AND gate 106, and a counter (or shift register) 107. The first selector 103 receives the output signals of the EXOR gates $56_1$ and $56_2$ of the processing unit $55_1$ and $55_2$, respectively. The second selector 104 receives the output signals of the AND gates $57_1$ and $57_2$. Selections at the first selector 103 and the second selector 104 are controlled by the /Q output of the SR-FF 61 of the selection unit 35.

The 4-input OR gate 105 receives the four outputs of the counters 91 and 92 provided in each of the first synchronism-protection circuit 81 and the second synchronism-protection circuit 82. When any one of the four counters 91 and 92 generates a high-level output, the 4-input OR gate 105 generates a high-level output, which is applied to the AND gate 106 along with the output of the first selector 103. The counter 107 receives an output of the AND gate 106 as count data and an output of the second selector 104 as a clock signal. An output of the counter 107 is provided to the reset-pulse generating unit 102.

The reset-pulse generating unit 102 includes a D-FF 108, a D-FF 109, and a NOR gate 110 connected in series. The NOR gate 110 receives the /Q output of the D-FF 108 and the Q output of the D-FF 109. The D-FFs 108 and 109 receive at clock nodes (C) thereof the clock signal CLK1 from the clock distribution unit $59_1$ (or $59_2$) An output of the NOR gate 110 is provided to reset nodes (R) of the counters 91 and 92 of the first and second synchronism-protection circuits 81 and 82. Other configuration is the same as that shown in FIG. 11.

As described above, when one of the four counters 91 and 92 of the first and second synchronism-protection circuits 81 and 82 generates a high-level signal, the output of the 4-input OR gate 105 becomes the high level. This high-level output of the 4-input OR gate 105 is applied to the AND gate 106 to provide the counter 107 with the output of the first selector 103. Here, the output of the first selector 103 is originated from the side on which the identified data is not selected by the identified-data-selection-signal processing unit 83. When an event in which the identified data selected as appropriate at first is determined to be inappropriate is counted a predetermined times by the counter 107, the output of the counter 107 changes from the low level to the high level. When this happens, the reset-pulse generating unit 102 generates a reset pulse having a pulse width of one bit, for example, to reset the four counters 91 and 92 of the first and second synchronism-protection circuits 81 and 82.

In this manner, the phase-relation monitoring unit 101 monitors the phase relation between the input data and the identifying clock. That is, when the phase relation between the input data and the identifying clock is changed after the identified data is selected as appropriate, the fact that the identified data selected as appropriate becomes inappropriate is detected. When this is detected, the reset-pulse generating unit 102 generates the reset pulse to reset the four counters 91 and 92 of the first and second synchronism-protection circuits 81 and 82.

Each time the phase relation between the input data and the identifying clock is changed, the output of the data identifying device 31 may change. It may require a certain period of time before the changed identified data becomes stable. However, certain types of systems may require the identified data to be generated without any break. Thus, the identified data should be changed while keeping a continuity thereof.

FIG. 13 is a block diagram of a data identifying device according to a fourth embodiment of the present invention. The data identifying device of FIG. 13 differs from that of FIG. 12 only in that a phase-condition extracting unit 111 and a correction unit 112 are provided between the multiplexer 62 and the identifying parts (D-FFs) $51_1$ and $51_2$, that an EXOR gate 113 is provided to apply the selection signal to the multiplexer 62, and that the reset-pulse generating unit 102 is non-existent.

The phase-condition extracting unit 111 includes an EXOR gate 114, AND gates 115 through 117, and a selector-attached D-FF 118. The EXOR gate 114 receives the output signals of the identifying parts (D-FFs) $51_1$ and $51_2$ of the first identifying unit 32 and the second identifying unit 34, respectively. The AND gate 115 receives an output signal of the EXOR gate 114 and an output signal of the AND gate 116. The AND gate 116 receives the Q output of the SR-FF 61 and the output signal of the 4-input OR gate 105 of the phase-relation monitoring unit 101. Also, the AND gate 117 receives the output signal of the counter 107 and the clock signal CLK1 from the clock distribution unit $59_1$ (or $59_2$).

The selector-attached D-FF 118 receives an output signal thereof as a feedback signal, and, also, receives the output signal of the AND gate 115. Also, the selector-attached D-FF 118 receives the output signal of the EXOR gate 114 at a select node thereof, and receives the output signal of the AND gate 117 at a clock node thereof.

The correction unit 112 includes D-FFs 119 through 122 forming two shift-registers, two multiplexers 123 and 124, and three-input AND gates 125 and 126. The D-FFs 119 and 121 receive the identified data from the identifying parts $51_1$ and $51_2$, respectively. The D-FFs 120 and 122 receive output signals of the D-FFs 119 and 121 at a preceding stage, respectively. Clock nodes of the D-FFs 119 through 122 receive the clock signal CLK1 from the clock distribution unit $59_1$ and $59_2$ respectively.

The multiplexer 123 receives output signals of the D-FFs 119 and 120, and the multiplexer 124 receives output signals of the D-FFs 121 and 122. A select node of the multiplexer 123 receives an output signal of the three-input AND gate 125, which are provided with the output signal of the counter 107 of the phase-relation monitoring unit 101, the output signal of the selector-attached D-FF 118, and the Q output of the SR-FF 61.

A select node of the multiplexer 124 receives an output signal of the three-input AND gate 126, which are provided with the inverse of the output signal of the counter 107, the output signal of the selector-attached D-FF 118, and the inverse of the Q output of the SR-FF 61.

Output data of each of the multiplexers (or selectors) 123 and 124 is provided to the multiplexer (or selector) 62, whose select node receives the output signal of the EXOR gate 113. The EXOR gate 113 receives the Q output of the SR-FF 61 and the output signal of the counter 107.

An operation of the above-described configuration will be briefly described below. The phase-relation monitoring unit 101 monitors the phase relation between the input data and the identifying clock, and detects a situation in which the phase relation between the input data and the identifying clock is changed to make the selected identified data inappropriate, which identified data has been selected by the synchronism-protection circuits 81 and 82. When such a situation takes place, the correction unit 112 outputs the appropriate identified data based on the phase relation between the input data and the identifying clock extracted by the phase-condition extracting unit 111.

FIGS. 14A through 14H are time charts for showing relations between the two signals of the input data on the two different pathways and between the two output signals of the identified data generated through the two pathways. FIG. 14A shows the input data applied to the identifying part $51_1$ of the first identifying unit 32. FIG. 14B shows the input data applied to the identifying part $51_2$ of the second identifying unit 34, which input data is delayed by the delay unit 33 by a time delay D from the input data of FIG. 14A. By taking into consideration the signal levels of the two pieces of the input data shown in FIGS. 14A and 14B, a period in which either the two pieces of the input data is at the high level can be divided into three periods, i.e., a period X in which the input data of FIG. 14A is 1 and the input data of FIG. 14B is 0, a period Y in which the input data of FIG. 14A is 1 and the input data of FIG. 14B is 1, and a period Z in which the input data of FIG. 14A is 0 and the input data of FIG. 14B is 1.

In the bottom of FIG. 14B are shown time periods A and B. In the time periods A, the identified data obtained from the input signal of FIG. 14A should be selected as appropriate when a pulse of the identifying clock is positioned within these time periods. Likewise, in the time periods B, the identified data obtained from the input signal of FIG. 14B should be selected as appropriate when a pulse of the identifying clock is positioned within these time periods.

As shown in the bottom of FIG. 14B, each of the periods X, Y, and Z includes both the time period A and the time period B. That is, within each of the periods X, Y, and Z, a transition between the identified data obtained from the input data of FIG. 14A and the identified data obtained from the input data of FIG. 14B can take place when the phase relation between the input data and the identifying clock changes.

FIGS. 14C and 14D show the identified data output from the identifying part $51_1$ and $51_2$, respectively, when the identifying clock pulse is positioned in the period X. FIGS. 14E and 14F show the identified data output from the identifying part $51_1$ and $51_2$, respectively, when the identifying clock pulse is positioned in the period Y. FIGS. 14G and 14H show the identified data output from the identifying part $51_1$ and $51_2$, respectively, when the identifying clock pulse is positioned in the period Z. In periods X and Z (FIGS. 14C and 14D and FIGS. 14G and 14H, respectively), the identified data is displaced by one bit between the identifying parts $51_1$ and $51_2$. Thus, in the periods X and Z, when a transition of the identified data occurs, a duplication of one bit or loss of one bit will be observed in the output data. In the period Y, there will be no duplication or loss of one bit.

In the phase-condition extracting unit 111, the EXOR gate 114 detects a condition in which the duplication or the loss of one bit takes place, by utilizing the fact that the outputs of the identifying parts $51_1$ and $51_2$ have the different signal levels at proximities of rising or falling edges. Then, the selector-attached D-FF 118 generates a signal instructing the correction unit 112 to correct the output of the identified data.

The correction unit 112 has the two shift-registers formed from the D-FFs 119 through 122. The multiplexers 123 and 124 select one-bit forwarded outputs of the shift-registers when there would be the duplication of one bit, and select one-bit delayed outputs of the shift-registers when there would be the loss of one bit. The selections at the multiplexers 123 and 124 are controlled by the three-input AND gates 125 and 126.

In this manner, the appropriate identified data is output without any break or any duplication in the data.

Figure 15A:
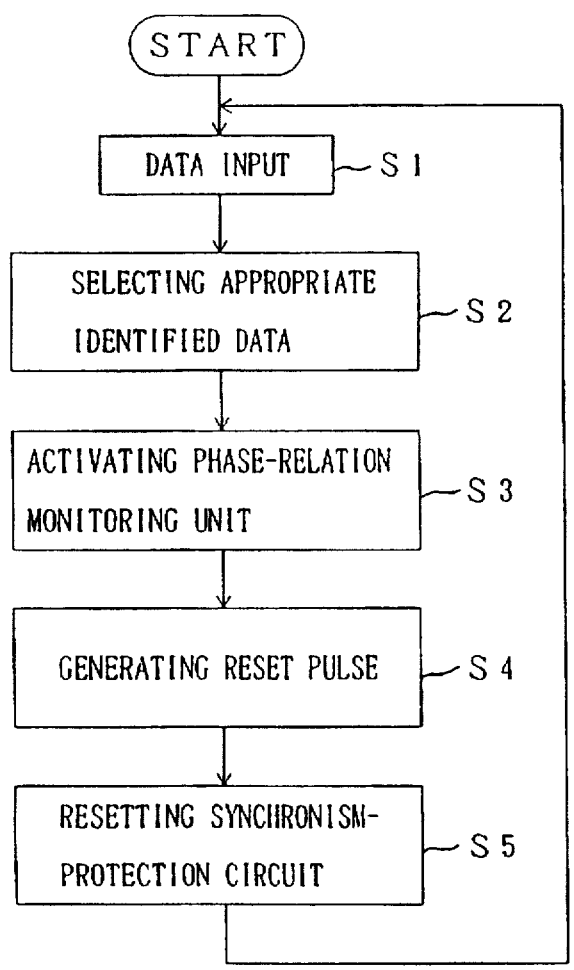
FIGS. 15A and 15B are flowcharts of a process of switching the identified data according to the third embodiment and the fourth embodiment, respectively.
Figure 15B:
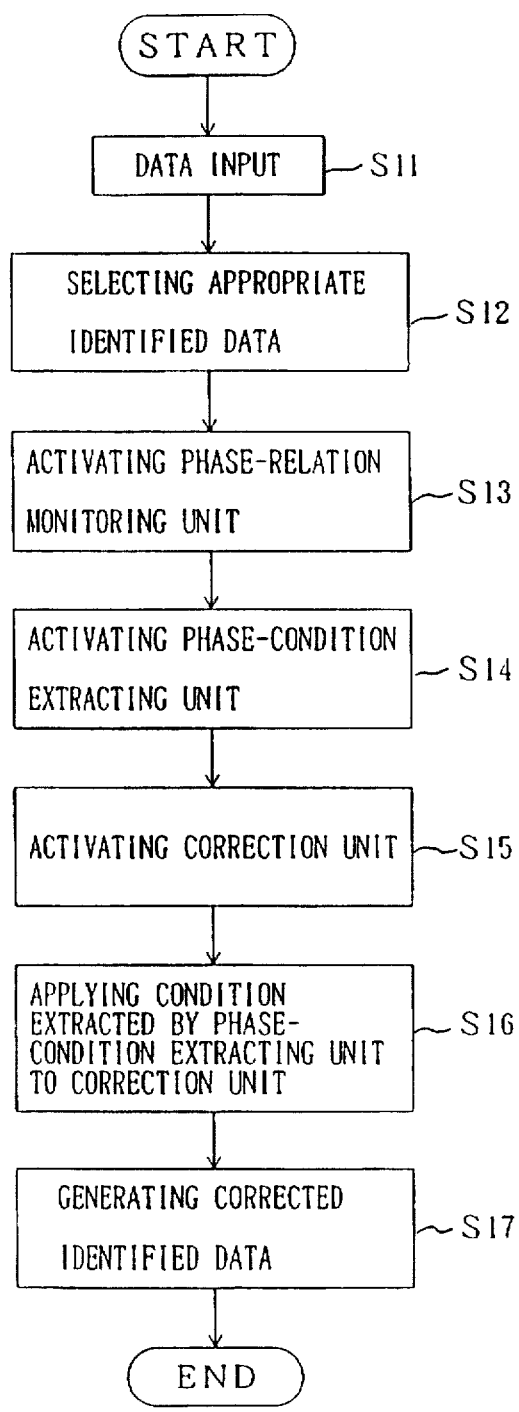

FIGS. 15A and 15B are flowcharts of a process of switching the identified data. FIG. 15A shows the process of switching the identified data according to the third embodiment of the present invention, and FIG. 15B shows the process of switching the identified data according to the fourth embodiment of the present invention.

In FIG. 15A, at a step S1, the input data is input. At a step S2, the appropriate identified data is selected by counting up the counters 91 and 92 of the synchronism-protection circuits 81 and 82. At a step S3, the phase-relation monitoring unit 101 is activated when the output of the 4-input OR gate 105 becomes the high level. At a step S4, the reset pulse is generated after the counter 107 of the phase-relation monitoring unit 101 counts up to a predetermined count. At a step S5, the counters 91 and 92 of the synchronism-protection circuits 81 and 82 are reset by the reset pulse. Then, the procedure goes back to the step S1.

In FIG. 15B, at a step S11, the input data is input. At a step S12, the appropriate identified data is selected by counting up the counters 91 and 92 of the synchronism-protection circuits 81 and 82. At a step S13, the phase-relation monitoring unit 101 is activated when the output of the 4-input OR gate 105 becomes the high level. At a step S14, the phase-condition extracting unit 111 is activated. At a step S15, the correction unit 112 is activated. At a step S16, a condition (whether the identified data should be corrected) extracted by the phase-condition extracting unit 111 is applied to the correction unit 112. At a step S17, the correction unit 112 generates the corrected identified data.

In this manner, the input data is identified by keeping the phase relation between the input data and the identifying clock appropriate in a stable and reliable manner. Also, the data identifying device 31 can be formed solely from logic circuits, so that a lower cost production of the device is achieved by using gate arrays. Since the light receiver 41 has a simple configuration and can be manufactured at a lower cost, the present invention can provide light receivers suitable for the short-range optical transmission systems such as the subscriber-line systems.

The light receivers 41 described above can be provided in parallel to receive optical signals transmitted through a plurality of optical transmission lines. In this case, at least one timing circuit may be provided in one of the receiving circuits. In such a configuration, the identified data is output in synchronism with a single clock phase, so that phases of the signals on the plurality of channels can be matched with each other.

Figure 16:
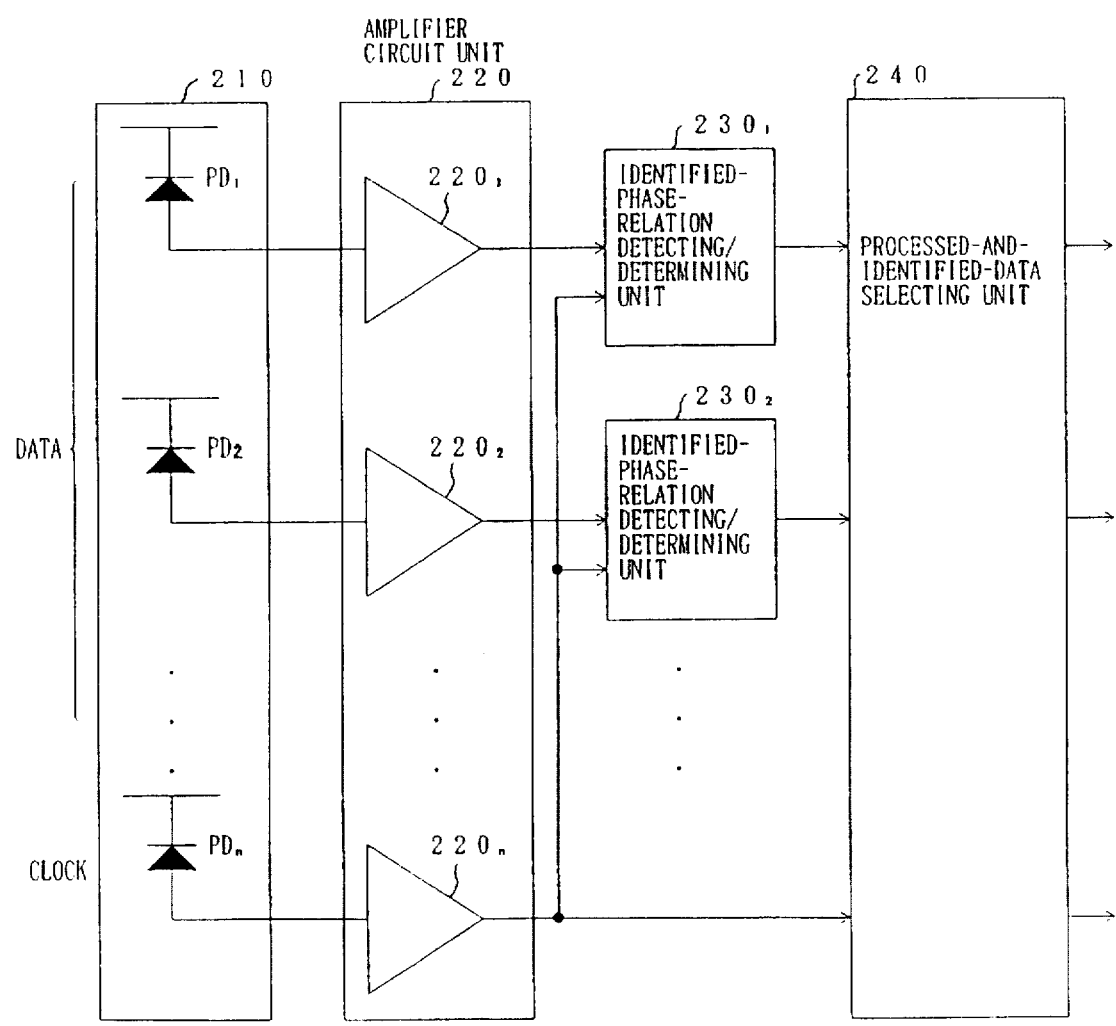
FIG. 16 is a block diagram of a parallel light receiver used in a case where a clock signal is transmitted through an optical transmission line separate from a plurality of optical data transmission lines.

Also, a clock signal may be transmitted through an optical transmission line separate from the data transmission lines. Depending on a system configuration, a system clock which is totally different may be input to be used as a clock signal. FIG. 16 is a block diagram of a parallel light receiver used in a case where a clock signal is transmitted through an optical transmission line separate from a plurality of optical data transmission lines. In the figure, a photo-diode set 210 includes photo-diodes $PD_1$ through $PD_n$, and receives optical signals via optical fibers which are bundled to form a fiber ribbon. Each of the photo-diodes $PD_1$ through $PD_{n-1}$ receives a corresponding optical data signal, and the photo-diode $PD_n$ receives an optical clock signal.

Outputs of the photo-diodes $PD_1$ through $PD_n$ are supplied to an amplifier-circuit unit 220. The amplifier-circuit unit 220 includes n equalizing amplifiers $220_1$ through $220_n$ corresponding to the photo-diodes $PD_1$ through $PD_n$, and is comprised of gate arrays. Identified-phase-relation detecting/determining units $230_1$ through $230_{n-1}$ are provided for each input data, and correspond to the equalizing amplifiers $230_1$ through $230_{n-1}$. Each of the identified-phase-relation detecting/determining units $230_1$ through $230_n$ is comprised of a discrete logic circuit to implement the identifying part $51_1$ ($51_2$), the phase-relation detecting unit $52_1$ ($52_2$), the phase-relation determining units $53_1$ ($53_2$) and $54_1$ ($54_2$), and the delay unit 33. Each of the identified-phase-relation detecting/determining units $230_1$ through $230_{n-1}$ receives an output of a corresponding one of the equalizing amplifiers $220_1$ through $220_{n-1}$, and is provided with an output clock of the equalizing amplifier $220_n$.

The processed-and-identified-data selecting unit 240 is comprised of gate arrays to implement a portion of a circuit of FIG. 4 which carries out a logical synchronization process for the input data on each of the n-1 pathways. The processed-and-identified-data selecting unit 240 receives output data of each of the identified-phase-relation detecting/determining units $230_1$ through $230_{n-1}$ and the output clock of the equalizing amplifier $220_n$ so as to generate appropriate identified data for each of the n-1 pathways.

As described above, in the data identifying device according to the present invention, the input data is supplied to the first identifying unit, and is supplied to the second identifying unit with a delay incurred by the delay unit. At both identifying units, the input data is identified by using the same identifying clock, and the phase relation between the input data and the identifying clock is determined. Then, the selection unit selects the appropriate identified data based on the determination of the phase relation. Thus, a simple circuit structure can generate the appropriate identified data by selecting an appropriate phase relation between the input data and the identifying clock. Also, the device of the present invention may be arranged in parallel to obtain a plurality of signals of the identified data which have coherent phase with each other.

Also, according to the present invention, the phase relation between the input data and the identifying clock is obtained as a phase-relation pulse by comparing the input data and the identified data. Then, the phase-relation pulse is identified by the first and second phase-relation determining units using predetermined clock signals to generate the phase-relation determination result. Thus, a simple circuit structure can select an appropriate phase relation between the input data and the identifying clock.

Also, according to the present invention, the clock distribution units generate the clock signals having various predetermined phases through delay units such as gate elements and delay elements. Also, the phase controlling unit controls the phase of one of the clock signals. In this manner, the first phase-relation determining unit and the second phase-relation determining unit use the clock signals which have half-the-time-slot phase difference from each other. Thus, a simple circuit structure can select an appropriate phase relation between the input data and the identifying clock.

Also, according to the present invention, when the delay unit provides a time delay for the input data supplied to the second identifying unit 34, the input data is delayed by half the time slot, which is determined by a bit rate of the input data. Thus, the input data is identified by using the identifiable data period thereof.

Also, according to the present invention, the clock signals supplied to the first phase-relation determining unit and the second phase-relation determining unit have a phase difference of half the time slot or one fourth the time slot from each other. Thus, the input data is identified by using the identifiable data period thereof.

Also, according to the present invention, the first and second synchronism-protection circuits provided for the first and second identifying units, respectively, count the number of phase-relation determination results. Then, the selection unit selects the appropriate identified data based on the result of the count. Thus, a high-speed signal can be identified, and, also, the instability of the selected identified data caused by a variation or instability of the internal circuits is prevented. Thus, the input data is identified reliably.

Also, according to the present invention, the phase-relation monitoring unit monitors the phase relation between the input data and the identifying clock so as to detect a change in the phase relation after the selection of the appropriate identified data by the first and second synchronism-protection circuits. When the change is detected, the reset-pulse generating unit generates the reset pulse to reset the counting operation of the first and second synchronism-protection circuits. Thus, the device of the present invention can cope with a system in which the phase relation is unstable.

Also, according to the present invention, when the phase relation is changed, the correction unit outputs the appropriate identified data based on the phase relation between the input data and the identifying clock extracted by the phase-condition extracting unit. Thus, the identified data can be output without any break or duplication thereof.

Also, according to the present invention, the identifying part, the phase-relation detecting unit, the first and second phase-relation determining units, and the delay unit may be comprised of discrete logic circuits, while other circuits are implemented by gate arrays. Thus, a simulation of the entire device can be carried out at the time of a circuit design to facilitate the product development. Also, since most of the device is comprised of gate arrays, mass-production at a low cost is achievable.

Also, according to the present invention, the delay unit may be comprised of a variable-delay circuit which can adjust the amount of delay. Thus, the device can be flexibly adapted to employed bit rate and transmission characteristics, leading to an enhanced flexibility.

Also, according to the present invention, the light receiver includes the data identifying device described above, the light receiving unit, and the timing extraction unit for extracting the identifying clock from the input data. Thus, transmitted optical signals are identified to generate the identified data by a simple circuit structure which determines the appropriate phase relation between the input data and the identifying clock. Furthermore, the light receivers can be provided in parallel for a plurality of transmission lines, so that signals of the plurality of channels have an aligned phase relation with each other.

Further, the present invention is not limited to these embodiments, but various variations and modifications may be made without departing from the scope of the present invention.

What is claimed is:

1. A device for identifying input data by using a first clock signal, said device comprising:
   a first identifying unit which identifies said input data by using said first clock signal to generate first identified data, and generates a first phase-relation determination result indicating whether a phase relation between said input data and said first clock signal is such that an identifiable period of said input data is used in identifying said input data;
   a delay unit for delaying said input data by a predetermined phase amount to generate delayed input data;
   a second identifying unit which identifies said delayed input data by using said first clock signal to generate second identified data, and generates a second phase-relation determination result indicating whether a phase relation between said delayed input data and said first clock signal is such that an identifiable period of said delayed input data is used in identifying said delayed input data;
   a selection unit which selects one of said first identified data and said second identified data based on at least one of said first phase-relation determination result and said second phase-relation determination result.

2. A device for identifying input data by using a first clock signal, said device comprising:
   a first identifying unit which identifies said input data by using said first clock signal to generate first identified data, and generates a first phase-relation determination result by determining whether a phase relation between said input data and said first clock signal is appropriate;
   a delay unit for delaying said input data by a predetermined phase amount to generate delayed input data;
   a second identifying unit which identifies said delayed input data by using said first clock signal to generate second identified data, and generates a second phase-relation determination result by determining whether a phase relation between said delayed input data and said first clock signal is appropriate;
   a selection unit which selects one of said first identified data and said second identified data based on at least one of said first phase-relation determination result and said second phase-relation determination result;
   wherein each of said first identifying unit and said second identifying unit includes:
      an identifying unit which identifies corresponding input data by using said first clock signal to generate corresponding identified data, said corresponding input data being corresponding one of said input data and said delayed input data and said corresponding identified data being a corresponding one of said first identified data and said second identified data;
      a phase-relation detecting unit which generates a pulse signal based on said corresponding input data and said corresponding identified data, said pulse signal having a position in time indicative of said phase relation;
      a first phase-relation determining unit which makes a coarse determination of said position by using a second clock signal to generate a first phase relation;
      a second phase-relation determining unit which makes a fine determination of said position by using a third clock signal having a different phase from that of said second clock signal to generate a second phase relation; and
      a processing unit which generates a corresponding one of said first phase-relation determination result and said second phase-relation determination result based on said first phase relation, said second phase relation, and said corresponding identified data.

3. The device as claimed in claim 2, wherein said predetermined phase amount is generally half of a pulse width corresponding to one bit of said input data.

4. The device as claimed in claim 3, wherein said second clock signal has a phase difference corresponding to half the pulse width compared to said first clock signal, and said third clock signal has a phase difference corresponding to one fourth the pulse width compared to said second clock signal.

5. The device as claimed in claim 4, wherein each of said first identifying unit and said second identifying unit further comprises:
   a clock distribution unit which generates said second clock signal and said third clock signal based on said first clock signal; and
   a phase controlling unit which controls a phase of said third clock signal based on said first phase relation.

6. The device as claimed in claim 5, wherein said clock distribution unit comprises delay means for delaying said first clock signal to generate said second clock signal and said third clock signal.

7. The device as claimed in claim 6, wherein said phase controlling unit comprises change means for passing said third clock signal unchanged or changing a phase of said third clock signal according to said first phase relation.

8. The device as claimed in claim 7, wherein said change means changes said phase of said third clock signal by half the pulse width.

9. The device as claimed in claim 8, wherein each of said delay means and said change means comprises one of a gate device, a fixed delay element, and a flexible delay element.

10. A device for identifying input data by using a first clock signal, said device comprising:
   a first identifying unit which identifies said input data by using said first clock signal to generate first identified data, and generates a first phase-relation determination result by determining whether a phase relation between said input data and said first clock signal is appropriate;
   a delay unit for delaying said input data by a predetermined phase amount to generate delayed input data;

a second identifying unit which identifies said delayed input data by using said first clock signal to generate second identified data, and generates a second phase-relation determination result by determining whether a phase relation between said delayed input data and said first clock signal is appropriate;

a selection unit which selects one of said first identified data and said second identified data based on at least one of said first phase-relation determination result and said second phase-relation determination result;

a first synchronism-protection unit counting how many times said first identifying unit generates the same first phase-relation determination result;

a second synchronism-protection unit counting how many times said second identifying unit generates the same second phase-relation determination result; and an identified-data-selection-signal processing unit sending said selection unit a signal indicating which one of said first identified data and said second identified should be selected, based on results of counting operations of said first synchronism-protection unit and said second synchronism-protection unit.

11. The device as claimed in claim 10, further comprising:

a phase-relation monitoring unit monitoring a change in said phase relation to detect a situation in which a current selection of one of said first identified data and said second identified data by said selection unit becomes inappropriate; and a reset-pulse generating unit which generates a reset pulse upon said phase-relation monitoring unit detecting said situation, said reset pulse resetting said first synchronism-protection unit and said second synchronism-protection unit to restart said counting operations.

12. A device for identifying input data by using a first clock signal, said device comprising:

a first identifying unit which identifies said input data by using said first clock signal to generate first identified data, and generates a first phase-relation determination result by determining whether a phase relation between said input data and said first clock signal is appropriate;

a delay unit for delaying said input data by a predetermined phase amount to generate delayed input data;

a second identifying unit which identifies said delayed input data by using said first clock signal to generate second identified data, and generates a second phase-relation determination result by determining whether a phase relation between said delayed input data and said first clock signal is appropriate;

a selection unit which selects one of said first identified data and said second identified data based on at least one of said first phase-relation determination result and said second phase-relation determination result;

a phase-relation monitoring unit monitoring a change in said phase relation to detect a situation in which a current selection of one of said first identified data and said second identified data by said selection unit becomes inappropriate;

a phase-condition extracting unit extracting a condition in which said first identified data and said second identified data have different timing from each other; and a correction unit correcting timing of one of said first identified data and said second identified data based on said condition, which one is newly selected by said selection unit responding to said situation, so that a transition between said first identified data and said second identified data is made in the absence of duplication of data or loss of data.

13. The device as claimed in claim 2, wherein each of said identifying unit, said phase-relation detecting unit, said first phase-relation determining unit, and said second phase-relation determining unit comprises a discrete logic circuit, and other units comprise gate arrays.

14. The device as claimed in claim 1, wherein said delay unit comprises a discrete logic circuit.

15. The device as claimed in claim 14, wherein said delay unit comprises a variable-delay circuit which can adjust a delay amount.

* * * * *